US012371628B2

(12) United States Patent
Burgos et al.

(10) Patent No.: US 12,371,628 B2
(45) Date of Patent: Jul. 29, 2025

(54) NON-FOSSIL, BIODIESEL FUEL BLENDS AND METHODS OF PRODUCTION THEREOF

(71) Applicants: Francisco Jose Burgos, Maple Grove, MN (US); Jaime David Juliao, Sunny Isles Beach, FL (US)

(72) Inventors: Francisco Jose Burgos, Maple Grove, MN (US); Jaime David Juliao, Sunny Isles Beach, FL (US)

(73) Assignees: Francisco Jose Burgos, Maple Grove, MN (US); Jaime David Juliao, Sunny Isles Beach, FL (US)

( * ) Notice: Subject to any disclaimer, the term of this patent is extended or adjusted under 35 U.S.C. 154(b) by 0 days.

(21) Appl. No.: 18/887,902

(22) Filed: Sep. 17, 2024

(65) Prior Publication Data

US 2025/0092326 A1 Mar. 20, 2025

Related U.S. Application Data

(60) Provisional application No. 63/629,069, filed on Sep. 18, 2023.

(51) Int. Cl.
*C10L 1/06* (2006.01)

(52) U.S. Cl.
CPC .......... *C10L 1/06* (2013.01); *C10L 2200/0476* (2013.01); *C10L 2200/0484* (2013.01); *C10L 2200/0492* (2013.01); *C10L 2270/026* (2013.01)

(58) Field of Classification Search
CPC ..... C10L 2200/0476; C10L 2200/0484; C10L 2270/026; C10L 2200/0492
See application file for complete search history.

(56) References Cited

U.S. PATENT DOCUMENTS

| 2008/0051599 A1* | 2/2008 | Adami | C11C 3/003 |
| | | | 560/129 |
| 2010/0037513 A1* | 2/2010 | Petrucci | C10L 1/328 |
| | | | 44/301 |
| 2012/0255222 A1* | 10/2012 | DiBiase | C10L 10/16 |
| | | | 44/388 |
| 2013/0269240 A1 | 10/2013 | Turra de Ávila | |

FOREIGN PATENT DOCUMENTS

| EP | 1331260 B1 * | 5/2008 | .............. C10L 1/026 |
| FR | 2895418 A1 * | 6/2007 | .............. C10L 1/026 |
| WO | WO-2023/230165 A1 | 11/2023 | |

OTHER PUBLICATIONS

Machine Translation of FR2895418A1 (Year: 2008).*
Machine Translation of FR2895418A1 (Year: 2007).*
Kuznetsov, Genii & Dorokhov, Vadim & Vershinina, Ksenia & Kerimbekova, Susanna & Romanov, Daniil & Kartashova, Ksenia. (2023). Composite Liquid Biofuels for Power Plants and Engines: Review. Energies. 16. 5939, pp. 1-20 (Year: 2023).*
Invitation to Pay Additional Fees for Int'l Patent App. No. PCT/US2024/047098 dated Nov. 6, 2024, 3 pages.
Kuznetsov, et al., "Composite Liquid Biofuels for Power Plants and Engines: Review," Energies 16(16):5939, 20 pages (2023).
Anumukonda, Vara Prasad, and Navdeep Sharma Dugala. "Preparation of biodiesel and experimental investigation of biodiesel blends on diesel engine at varying speed." IOP Conference Series: Earth and Environmental Science. vol. 1110. No. 1. IOP Publishing, 2023.
Athar, Moina, Sadaf Zaidi, and Saeikh Zaffar Hassan. "Intensification and optimization of biodiesel production using microwave-assisted acid-organo catalyzed transesterification process." Scientific reports 10.1 (2020): 21239.
Chongcheng Huang, Yaoting Li, et al., Proceedings of the institution of mechanical engineers part D / Journal of Automobile engineering:234(13) DOI: 10.1177/0954407020916989 (2020).
Ciolkosz, Daniel. "What's so different about biodiesel fuel ?. " Bioenergy. Academic Press, 2020.
Diesel Fuel Technical Review, 2007 Chevron. "Better if 50-55."
Rating Diesel: Understanding cetane numbers Chip-Express. chipexpress.com/articles/rating-diesel-understanding-cetane-numbers/#:~:text=If%20it%20has%20a%20high,powerfully%20while%20producing%20less%20emissions.
EN 590 Diesel Fuel and Test Methods (2005) Table 5.2 cited by Diesel Fuel Technical Review (2007), p. 52—chevron.com/-/media/chevron/operations/documents/diesel-fuel-tech-review.pdf.
EPA (2023), “Learn About Impacts of Diesel Exhaust and the Diesel Emissions Reduction Act (DERA), ” Web: Jun. 18, 2023 epa.gov/dera/learn-about-impacts-diesel-exhaust-and-diesel-emissions-reduction-act-dera.
Febriansyah, Hermawan, Fajar Budi Utomo, and Suminto Suminto. "The readiness of Indonesia to Implement blended biodiesel B30." E3S Web of Conferences. vol. 190. EDP Sciences, 2020.
Gerveni, M., T. Hubbs and S. Irwin. "Biodiesel and Renewable Diesel: It's All About the Policy." Farmdoc daily (13):27, Department of Agricultural and Consumer Economics, University of Illinois at Urbana-Champaign, Feb. 15, 2023.
Hot Shot's Secrets (2022), "Biodiesel-vs.-diesel-what's-the-difference," Web: Jun. 18, 2023. hotshotsecret.com/biodiesel-vs-diesel-whats-the-difference/#:~:text=Biodiesel%20has%20a%20higher%20lubricity,is%20also%20nontoxic%20and%20biodegradable.
Nadir Yilmaz, Alpaslan Atmanli, and Francisco M. Vigil Quaternary blends of diesel, biodiesel, higher alcohols and vegetable oil in a compression ignition engine, Fuel vol. 212, Jan. 15, 2018, pp. 462-469. DOI: https://doi.org/10.1016/j.fuel.2017.10.050.
National Renewable Energy Laboratory (NREL), Biodiesel Cloud Point Specifications and Testing, p. 8—nrel.gov/docs/fy11osti/46592.pdf.

(Continued)

*Primary Examiner* — Ellen M McAvoy
*Assistant Examiner* — Ming Cheung Po
(74) *Attorney, Agent, or Firm* — FOLEY & LARDNER LLP

(57) ABSTRACT

Disclosed herein are zero fossil carbon biodiesel fuel blends and methods of production thereof. Fuel blends of the present disclosure include quaternary blends comprising biodiesel, biofuels, plant oils, and renewable diesel fuels. Fuel blends of the present disclosure can be used as drop-in fuels for most diesel engines without further additives or modifications.

19 Claims, No Drawings

(56) References Cited

OTHER PUBLICATIONS

Prabhu Appavu, Venkata Ramanan M, and Harish Venu, Quaternary blends of diesel/biodiesel/vegetable oil/pentanol as a potential alternative feedstock for existing unmodified diesel engine: Performance, Combustion and Emission Characteristics, S0360-5442(19)31528-2, Energy (2019) DOI: https://doi.org/10.1016/j.energy.2019.115856.

Ramalingam, Senthil, Paramasivam Chinnaia, and Silambarasan Rajendran. "Influence of compression ratio on the performance and emission characteristics of annona methyl ester operated DI diesel engine." Advances in Mechanical Engineering 6 (2014): 832470.

Verma, Tikendra Nath, et al. "A comprehensive review of the influence of physicochemical properties of biodiesel on combustion characteristics, engine performance and emissions." Journal of Traffic and Transportation Engineering (English Edition) 8.4 (2021): 510-533.

Zheng, Fangyuan, and Haeng Muk Cho. "The Effect of Different Mixing Proportions and Different Operating Conditions of Biodiesel Blended Fuel on Emissions and Performance of Compression Ignition Engines." Energies 17.2 (2024): 344.

Foreign Search Report on PCT/US2024/047098 Dtd Jan. 13, 2025.

Mohite, et al. "Biodiesel Production from High Free Fatty Acid Feed Stocks through Transesterification." International Conference of Advance Research and Innovation (ICARI). New Delhi. Jan. 31, 2015.

Preethivasani, et al. "Refuse-derived fuel for diesel engine utilizing waste transformer oil." Biofuels (Jan. 30, 2019).

Tabatabaei, et al. "Environmental impact assessment of the mechanical shaft work produced in a diesel engine running on diesel/biodiesel blends containing glycerol-derived triacetin." Journal of cleaner production 223 (Jun. 20, 2019): 466-486.

\* cited by examiner

US 12,371,628 B2

NON-FOSSIL, BIODIESEL FUEL BLENDS AND METHODS OF PRODUCTION THEREOF

CROSS-REFERENCE TO RELATED APPLICATIONS

This application claims the benefit of and priority to U.S. Provisional Patent Application No. 63/629,069, filed Sep. 18, 2023, which is incorporated herein by reference in its entirety for any and all purposes.

TECHNICAL FIELD

Disclosed herein are biodiesel fuel blends with no fossil carbon, and methods of production thereof. Fuel blends of the present disclosure include quaternary blends of biodiesel, biofuels, plant oils, and renewable diesel fuels, which can be used as drop-in fuels for most diesel engines without further additives or modifications.

BACKGROUND

Biodiesel is an increasingly important renewable fuel as the global economy shifts away from using fossil-carbon fuels that are causing climate change. However, the vast majority of biodiesel currently in use is blended with fossil carbon diesel (petrodiesel), such as the commonly sold B20 blend (20% biodiesel and 80% petrodiesel). Biodiesel and petrodiesel are blended to create a drop-in fuel, which is a fuel that can be used by modern diesel engines without any modifications to the vehicle and without causing damage to the engine or poor performance. Drop-in fuel blends must meet certain ranges of values for density, kinematic viscosity, heat value, cetane number, and cloud point, among others. Despite the need to transition to renewable fuels, non-fossil biodiesel fuel blends are not widely available.

It is against this backdrop that the compositions and methods of the present disclosure were developed.

SUMMARY

In one aspect, the present disclosure provides a drop-in biodiesel fuel blend comprising: (a) one or more biofuels selected from the group consisting of: 1-propanol; 1-butanol; triacetin; and ethanol (b) one or more plant oils selected from the group consisting of: sweet orange peel oil; turpentine oil; and refined degummed de-acidified Jatropha oil; (c) one or more biodiesels selected from the group consisting of: Jatropha oil derived biodiesel; waste cooking oil derived biodiesel; waste transformer oil derived biodiesel; palm oil derived biodiesel; and linseed oil derived biodiesel; and (d) one or more renewable diesels, wherein the renewable diesel is a Fischer-Tropsch diesel fuel and/or a hydrotreated vegetable oil; wherein the fuel blend does not comprise fossil fuel derived carbon. In some embodiments, the one or more biofuels are triacetin and 1-biobutanol. In some embodiments, the triacetin is about 3.1% of the mass of the fuel blend and the 1-biobutanol is about 2% of the mass of the fuel blend. In some embodiments, the one or more plant oils are turpentine oil and refined degummed de-acidified Jatropha oil. In some embodiments, the refined degummed de-acidified Jatropha oil is about 2% of the mass of the fuel blend and the turpentine oil is about 8.47% of the mass of the fuel blend. In some embodiments, the one or more biodiesels are Jatropha oil derived biodiesel, waste cooking oil derived biodiesel, waste transformer oil derived biodiesel, and palm oil derived biodiesel. In some embodiments, the Jatropha oil derived biodiesel is about 63.52% of the mass of the fuel blend, the waste cooking oil derived biodiesel is about 3% of the mass of the fuel blend, the waste transformer oil derived biodiesel is about 10% of the mass of the fuel blend, and the palm oil derived biodiesel is about 4.48% of the mass of the fuel blend. In some embodiments, the one or more renewable diesels is a hydrotreated vegetable oil. In some embodiments, the hydrotreated vegetable oil is about 3.43% to about 5.0% of the mass of the fuel blend. In some embodiments, triacetin is about 3.1% of the mass of the fuel blend, 1-biobutanol is about 2% of the mass of the fuel blend, refined degummed de-acidified Jatropha oil is about 2% of the mass of the fuel blend, turpentine oil is about 8.47% of the mass of the fuel blend, Jatropha oil derived biodiesel is about 63.52% of the mass of the fuel blend, waste cooking oil derived biodiesel is about 3% of the mass of the fuel blend, waste transformer oil derived biodiesel is about 10% of the mass of the fuel blend, palm oil derived biodiesel is about 4.48% of the mass of the fuel blend, and hydrotreated vegetable oil is about 3.43% of the mass of the fuel blend. In some embodiments, the fuel blend comprises: a cetane value of about 40 to about 90; a cloud point of about 273K to about 233.15K (or about −0.15° C. to about −40° C.); a density of about 0.89 kg/L to about 0.81 kg/L or about 0.88 kg/L to about 0.81 kg/L; a kinematic viscosity at 40° C. of about 2.3 cSt to about 6.0 cSt or about 3.75 cSt to about 4.78 cSt; and a heat value of about 42 MJ/kg to about 44 MJ/kg. In some embodiments, the fuel blend comprises: a cetane value of about 53.02; a cloud point of about 273K (or about −0.15° C.); a density of about 0.88 kg/L; a kinematic viscosity at 40° C. of about 4.78 cSt; and a heat value of about 42 MJ/kg. In some embodiments, the fuel blend does not further comprise additives selected from antioxidants, antimicrobial agents, anti-knocking agents, and kinematic viscosity enhancers.

In a different aspect, the present disclosure provides a method for generating a drop-in biodiesel fuel blend comprising mixing: (a) an amount of one or more biofuels selected from the group consisting of 1-propanol, 1-butanol, triacetin, and ethanol, and other lower alcohols; (b) an amount of one or more plant oils selected from the group consisting of sweet orange peel oil; turpentine oil and refined degummed de-acidified Jatropha oil; (c) an amount of one or more biodiesels selected from the group consisting of Jatropha oil derived biodiesel, waste cooking oil derived biodiesel, waste transformer oil derived biodiesel, palm oil derived biodiesel, and Lin seed oil derived biodiesel; and (d) an amount of one or more renewable diesels, wherein the renewable diesel is a Fischer-Tropsch diesel fuel and/or a hydrotreated vegetable oil, to create the fuel blend, wherein the fuel blend comprises: a cetane value of about 40 to about 55; a cloud point of about 273K to about 233.15K (or about −0.15° C. to about −40° C.); a density of about 0.89 kg/L to about 0.81 kg/L; a kinematic viscosity at 40° C. of about 2.3 cSt to about 6.0 cSt or about 3.75 cSt to about 4.78 cSt; and a heat value of about 42 MJ/kg to about 44 MJ/kg; and wherein the fuel blend does not comprise fossil fuel derived carbon. In some embodiments, the one or more biofuels are triacetin and 1-biobutanol. In some embodiments, the triacetin is about 3.1% of the mass of the fuel blend and the 1-biobutanol is about 2% of the mass of the fuel blend. In some embodiments, the one or more plant oils are turpentine oil and refined degummed de-acidified Jatropha oil. In some embodiments, the refined degummed de-acidified Jatropha oil is about 2% of the mass of the fuel blend and the turpentine oil is about 8.47% of the mass of the fuel blend.

In some embodiments, the one or more biodiesels are Jatropha oil derived biodiesel, waste cooking oil derived biodiesel, waste transformer oil derived biodiesel, and palm oil derived biodiesel. In some embodiments, the Jatropha oil derived biodiesel is about 63.52% of the mass of the fuel blend, the waste cooking oil derived biodiesel is about 3% of the mass of the fuel blend, the waste transformer oil derived biodiesel is about 10% of the mass of the fuel blend, and the palm oil derived biodiesel is about 4.48% of the mass of the fuel blend. In some embodiments, the one or more renewable diesels is a hydrotreated vegetable oil. In some embodiments, the hydrotreated vegetable oil is about 3.43% of the mass of the fuel blend. In some embodiments, triacetin is about 3.1% of the mass of the fuel blend, 1-biobutanol is about 2% of the mass of the fuel blend, refined degummed de-acidified Jatropha oil is about 2% of the mass of the fuel blend, turpentine oil is about 8.47% of the mass of the fuel blend, Jatropha oil derived biodiesel is about 63.52% of the mass of the fuel blend, waste cooking oil derived biodiesel is about 3% of the mass of the fuel blend, waste transformer oil derived biodiesel is about 10% of the mass of the fuel blend, palm oil derived biodiesel is about 4.48% of the mass of the fuel blend, and hydrotreated vegetable oil is about 3.43% of the mass of the fuel blend. In some embodiments, the method does not further comprise blending one or more additives selected from antioxidants, antimicrobial agents, anti-knocking agents, and kinematic viscosity enhancers. In some embodiments, the fuel blend comprises: a cetane value of about 50; a cloud point of about 273K (or about −0.15° C.); a density of about 0.85 kg/L; a kinematic viscosity at 40° C. of about 6.0 cSt; and a heat value of about 42 MJ/kg.

In one aspect, the present disclosure provides a drop-in biodiesel fuel blend comprising: (a) one or more biofuels selected from the group consisting of: 1-propanol; 1-butanol; triacetin; and ethanol (b) one or more plant oils selected from the group consisting of: sweet orange peel oil; turpentine oil; and refined degummed de-acidified Jatropha oil; (c) one or more biodiesels selected from the group consisting of: Jatropha oil derived biodiesel; waste cooking oil derived biodiesel; waste transformer oil derived biodiesel; palm oil derived biodiesel; and linseed oil derived biodiesel; and (d) one or more renewable diesels, wherein the renewable diesel is a Fischer-Tropsch diesel fuel and/or a hydrotreated vegetable oil; wherein the fuel blend does not comprise fossil fuel derived carbon; wherein each of (a)-(d) is present in an amount that produces a fuel blend comprising: a cetane value of about 40 to about 91; a cloud point of about 252K to about 275K; a density of about 0.80 kg/L to about 0.90 kg/L; a kinematic viscosity of about 3 cSt to about 5 cSt; and a heat value of about 42 MJ/kg to about 44 MJ/kg; and wherein the fuel blend does not comprise fossil fuel derived carbon. In some embodiments, the cetane value ranges from about 80 to about 85. In some embodiments, the one or more renewable diesels is a hydrotreated vegetable oil. In some embodiments, the hydrotreated vegetable oil is about 70% to about 99% of the mass of the fuel blend. In some embodiments, the hydrotreated vegetable oil is about 80% of the mass of the fuel blend. In some embodiments, the hydrotreated vegetable oil is about 90% of the mass of the fuel blend.

In one aspect, the present disclosure provides a method for generating a drop-in biodiesel fuel blend comprising mixing: (a) an amount of one or more biofuels selected from the group consisting of 1-propanol, 1-butanol, triacetin, ethanol, and other lower alcohols; (b) an amount of one or more plant oils selected from the group consisting of sweet orange peel oil; turpentine oil and refined degummed de-acidified Jatropha oil; (c) an amount of one or more biodiesels selected from the group consisting of Jatropha oil derived biodiesel, waste cooking oil derived biodiesel, waste transformer oil derived biodiesel, palm oil derived biodiesel, and Lin seed oil derived biodiesel; and (d) an amount of one or more renewable diesels, wherein the renewable diesel is a Fischer-Tropsch diesel fuel and/or a hydrotreated vegetable oil, to create the fuel blend, wherein the fuel blend comprises: a cetane value of about 40 to about 91; a cloud point of about 252K to about 275K; a density of about 0.80 kg/L to about 0.90 kg/L; a kinematic viscosity at 40° C. of about 3.0 cSt to about 5.0 cSt; and a heat value of about 42 MJ/kg to about 44 MJ/kg; and wherein the fuel blend does not comprise fossil fuel derived carbon. In some embodiments, the cetane value ranges from about 80 to about 85. In some embodiments, the one or more renewable diesels is a hydrotreated vegetable oil. In some embodiments, the hydrotreated vegetable oil is about 70% to about 99% of the mass of the fuel blend. In some embodiments, the hydrotreated vegetable oil is about 80% of the mass of the fuel blend. In some embodiments, the hydrotreated vegetable oil is about 90% of the mass of the fuel blend.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

I. Definitions

The definitions of certain terms as used in this specification are provided below. Unless defined otherwise, all technical and scientific terms used herein generally have the same meaning as commonly understood by one of ordinary skill in the art to which this present technology belongs.

As used herein with respect to numerical ranges, "about," "approximately," "substantially," and similar terms will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. For example, "about 10 wt %" would be understood to mean "9 wt % to 11 wt %." It is to be understood that when "about" precedes a term, the term is to be construed as disclosing "about" the term as well as the term without modification by "about"—for example, "about 10 wt %" discloses "9 wt % to 11 wt %" as well as disclosing "10 wt %."

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

"Drop-in fuels" and "drop-in fuel blends" refer to fuels that are suitable for use in an engine without any modifications to the engine or vehicle. Drop-in fuels and fuel blends have certain physical characteristics so as to not cause any performance issues or damage to the engine or vehicle from use thereof.

"Biofuels" refers to fuel derived from a biomass material, meaning any material of biological origin. Biofuels includes liquid, gas, and solid fuels. Examples of biofuels include, but are not limited to, 1-propanol, 1-butanol, triacetin, ethanol, biodiesel, renewable diesel (e.g., Fischer Tropsch and HVO), renewable heating oil, renewable jet fuel, renewable naphtha, renewable gasoline, biogas, and hydrogen gas.

"Biodiesel" refers to diesel fuel derived from biological sources via a transesterification method. Transesterification methods convert fats and oils into fatty acid alkyl esters via alcohol and catalyst reactions. Sources for biodiesel include, but are not limited to, vegetable oils, animal fats, recycled greases, and any other biological sources.

"Petrodiesel" refers to diesel fuel derived from non-biological sources. Sources of petrodiesel include fossil fuels and other non-biological resources.

"Plant oils" refers to any oil that is derived from a plant. Any plant can be a source for plant oils, and plant oils include, but are not limited to, Jatropha oil, sweet orange peel oil, Karanja oil, vegetable oil, palm oil, linseed oil, Pongamia tree oil, and wood/kraft turpentine oil.

"Renewable diesel" refers to diesel fuel derived from biological sources via hydrogenation or Fischer-Tropsch processes. Renewable diesel is a hydrocarbon fuel that is nearly indistinguishable from petrodiesel at a chemical level. Any biological source, including plant and animal matter, can be a used as a source material for renewable diesel production.

II. Diesel Fuel Blends and Biodiesels

Diesel fuels include any fuels that are designed for use in a diesel engine, which is an internal combustion engine where fuel is ignited by compression of inlet air and injection of fuel without a spark. The majority of diesel fuel in commercial use is petrodiesel, or blends thereof, which is derived from petroleum or other fossil fuel, non-biological sources. Petrodiesel can be produced from the fractional distillation of crude oil between 20° and 350° C. at atmospheric pressure, resulting in a mixture of carbon chains that typically contain between 9 and 25 carbon atoms per molecule. Due to the hazards posed by the continued release of fossilized carbon, diesel users have come under increasing pressure to find more sustainable alternatives.

Biodiesel represents one such compelling alternative. Biodiesels are derived from organic matter via transesterification of triglycerides or esterification of free fatty acids, typically with an alcohol and a catalyst to create a mixture of fatty acid esters. Methanol is a common alcohol used for making biodiesel, resulting in fatty acid methyl esters (FAME). When ethanol is used the resulting product is fatty acid ethyl esters (FAEE). Sources for biodiesel include, but are not limited to, vegetable oils, animal fats, recycled greases, and any other biological sources. For most diesel engines, biodiesel alone cannot serve as an effective drop-in fuel because the fuel's physical properties (e.g., cetane value, cloud point, density, kinematic viscosity, or heat value) would either not generate satisfactory performance, particularly at cold temperatures, or would cause damage to the engine, for example via oxidation. Therefore, most biodiesel currently on the market is sold as a fuel blend that is a majority petrodiesel: in the United States diesel blends contain petrodiesel in proportions ranging from 98% to 80% and, in some Southeast Asian countries like Indonesia and Malaysia diesel blends contain petrodiesel proportion ranging from 80% to 70%. To realize the beneficial environmental potential of biodiesel, fuel blends that do not comprise any petrodiesel, but which are suitable for use in unmodified diesel engines, are needed.

III. Overview

At present, drop-in fuel biodiesel blends still contain petrodiesel in proportions ranging from 98% to 80% in the United States and, in some Southeast Asian countries, such as Indonesia and Malaysia, petrodiesel is present in 80% of the mix, and just recently standards have been enacted that allow 70% petrodiesel in Indonesian biodiesel blends. The failure to drastically reduce the levels of fossil petrodiesel, and thus the level of contamination in an aggressive manner, is mostly responsible for the present plans to scrap the diesel engine industry from the markets.

The present disclosure provides formulations with no petrodiesel (a fossil fuel), with a zero fossil carbon footprint and because of the multiple renewable, degradable feedstocks and technologies used, allows for a reliable and cost-effective supply of a biodiesel drop-in fuel blend. Most modern diesel engines can run using the presently disclosed formulations without the need for modifications.

The technology of the present disclosure, in general, relates to renewable hydrocarbon compositions and in particular to drop-in biodiesel fuel blends. The drop-in biodiesel fuel blends of the present disclosure may be produced from oils and fats of vegetable/animal origin or waste materials, renewable diesel (Fischer-Tropsch diesel), and HVO (Hydrotreated Vegetable Oil). The present disclosure relates particularly, though not exclusively, to drop-in biodiesel fuel blends having low manufacturing cost, good cetane number, cloud point, kinetic viscosity, heat value, and density and thus, apt for use as a diesel fuel or a diesel fuel component.

In some embodiments, the drop-in biodiesel fuel blend of the present technology comprises B100 biodiesels made using less expensive feedstocks (e.g., Karanja oil (*Pongamia pinnata*), Jatropha C. oil etc.). Such B100 biodiesels must meet the ASTM standards, and are a blend-stock for the products of the present technology.

To obtain a drop-in biodiesel with zero fossil carbon, with no fossil fuel as diluent (typically Diesel (#1 #2 fuels), physicochemical principles of Green Chemistry (dilution, blend) were applied, including unit operations such as fluid transport, heat transfer, blend/mix, filtration, stoichiometry, thermodynamics, mass and energy balance. Components of the disclosed mixtures are vegetable/animal in origin, renewable, biodegradable, and non-fossil.

Ancillary tools such as heuristic methods, operations research, etc., were used to create the presently disclosed system.

The drop-in biodiesel fuel blends of the present technology can be: used directly as regular drop-in diesel fuel; subjected to tailor-made variations according to user needs; used to formulate blends of conventional petrodiesel with biodiesel; used as fuel additive (in minimal amounts) to improve certain characteristics such as lubricity and cetane number; used as a lubricant following pertinent adjustments; used as green K1 kerosene for heating and illumination with proper adjustments to the formula; and/or used as green jet fuel with pertinent adjustments to the formula.

STATE OF THE ART

Biodiesel is made up of alkyl esters of fatty acids produced by the trans-esterification of triglycerides (TG) or esterification of free fatty acids (FFAs) using alcohol with or without a catalyst. Methanol is the most common alcohol used for making biodiesel. Fatty acid esters that are produced by methanol are known as fatty acid methyl esters (FAME). In industrial applications, a homogeneous, alkali-catalyzed transesterification process is typically used because it has faster kinetics and is more economically feasible. See Athar, M., Zaidi, S. & Hassan, S. Z. (2020), "Intensification and optimization of biodiesel production using microwave-assisted acid-organo-catalyzed transesterification process." Biodiesel (a renewable hydrogen fuel), Diesel No. 1 and Diesel No. 2 (nonrenewable fossil fuels) are similar enough that they can be blended and used as a mixed fuel.

In fact, most biodiesel comes already mixed with petrodiesel. B20 is a common blend, and B5 (5% biodiesel, 95% petrodiesel) is often used in fleet vehicles. See Hot Shot's Secrets (2022), "Biodiesel-vs.-diesel-what's-the-difference," Web: Jun. 18, 2023.

Emissions from diesel engines using diesel fuel (pure or blended with biodiesel) contribute to the production of ground-level ozone, which damages crops, trees, and other vegetation. Acid rain is another byproduct of burning diesel fuel, which affects soil, lakes and streams and enters the human food chain via water, produce, meat and fish. See "Learn About Impacts of Diesel Exhaust and the Diesel Emissions Reduction Act (DERA)," Web: Jun. 18, 2023.

U.S. Patent Publication No. 2013269240-A1 describes a ternary blend containing: biodiesel, plant oil, lower alcohols for feeding diesel-cycle motors. This ternary blend differs from the present disclosure of drop-in fuel quaternary blends which comprise: i) biodiesel; ii) biofuels (lower alcohols, triacetin); iii) plant oil; and iv) renewable diesel fuels, with no fossil carbon or petrodiesel.

Proceedings of the institute of mechanical engineers part D (Journal of Automobile engineering 234 (13), Chongcheng Huang, Yaoting Li, et al. (2020)) describes binary "Biodiesel/Butanol blends as a pure biofuel excluding fossil fuels: effects on diesel engines combustion, performance and emission characteristics." This binary blend differs from the present disclosure of drop-in fuel quaternary blends which comprise: i) biodiesel; ii) biofuels (lower alcohols, triacetin); iii) plant oil; and iv) renewable diesel fuels, with no fossil carbon or petrodiesel.

Prabhu Appavu, et al. (Quaternary blends of diesel/biodiesel/vegetable oil/pentanol as a potential alternative feedstock for existing unmodified diesel engine: Performance, Combustion and Emission Characteristics, Energy, Vol. 186, 115856 (2019)) describes quaternary blends of petrodiesel/biodiesel/vegetable oil/pentanol that reduces the use of fossil oil. This fossil diesel containing blend differs from the present disclosure of drop-in fuel quaternary blends which comprise: i) biodiesel; ii) biofuels (lower alcohols, triacetin); iii) plant oil; and iv) renewable diesel fuels, with no fossil carbon or petrodiesel.

Nadir Yilmaz, et al. (Quaternary blends of diesel, biodiesel, higher alcohols and vegetable oil in a compression ignition engine, Fuel, Volume 212, Pages 462-469 (2018)) describes quaternary blends of petrodiesel, biodiesel, higher alcohols, and vegetable oil that reduces the use of fossil oil components. This fossil diesel containing blend differs from the present disclosure of drop-in fuel quaternary blends which comprise: i) biodiesel; ii) biofuels (lower alcohols, triacetin); iii) plant oil; and iv) renewable diesel fuels, with no fossil carbon or petrodiesel.

Compositions and Methods of the Present Technology

The present disclosure uses mathematical modeling, simulations and iterations to design the biodiesel drop-in fuel blends. The procedure was adapted and implemented onto an optimization software experimenting with input variations which have resulted in the fuel blend formulas of the present disclosure. Additional variations have resulted in different purpose formulations and different products.

In some embodiments, the renewable hydrocarbon blend as disclosed includes biodiesels of the first, second, and third generation, also renewable diesel of the type of Fischer-Tropsch (F-T) and Hydrotreated Vegetable Oils (HVO) and Biofuels that subrogate Fossil-Fuel paraffins and aromatics). The blends have a zero fossil carbon footprint, come from renewable, biodegradable feedstocks that are mainly from non-edible oil/fats, thereby minimizing/avoiding bioenergy competition for food crops and land and helping to reach energy independence. The presently disclosed biodiesel drop-in fuel blends have the required physical characteristics (e.g., heat value, cetane number, density, etc.) for use as a diesel fuel or a diesel fuel component. The presently disclosed biodiesel drop-in fuel blends can serve as a drop-in fuel that is functionally equivalent to petroleum fuels and fully compatible with existing distribution infrastructure.

The biodiesel present in the drop-in blends of the present technology has a higher oxygen content than petrodiesel. This should result in lower pollution emissions when the fuel is burned.

In the drop-in fuel blends of the present technology, the fatty acid composition, size, and saturation degree of the fatty acids may vary depending on the biological origin of the feedstocks employed, e.g., animal/vegetable of different geographical origins. The high melting point of bio-oil or fat (and their products from transesterification) is mainly a consequence of saturation degree. Low manufacturing cost and satisfactory characteristics such as cloud point, density, kinetic viscosity, energy density (heat value), and the cetane number of the drop-in fuel are reached by blending suitable biodiesels/biofuels of different origins.

In the drop-in biodiesel fuel blends of the present technology, oils and fats of biological origin and waste materials contain variable amounts of free fatty acids and glyceride-like surface-active impurities like phospholipids (phosphatidylcholine, phosphatidylethanolamine, lecithin among others), which have phosphorus in their chemical structures. Phospholipids (PL) are a group of polar lipids of gum-like materials, which should be removed before the transesterification reaction takes place.

Most or all of the biodiesel blends sold in the U.S. are B20 mixtures (80% petrodiesel). This mixture surrogates only 20% of fossil diesel mass present in the mixture. The present disclosure does not include fossil fuel, so that only biomass and or carbon zero synthetic fuel (e.g., Fischer-Tropsch Diesel) or HVO from biomass are burned.

The present disclosure provides a drop-in biodiesel fuel blend containing zero fossil fuel, improved properties, such as cold properties (cloud point and related characteristics)

without compromising cetane number, density, kinetic viscosity, and heat value, while having lower manufacturing costs.

Presently, the price of renewable hydrocarbon fuels is one of the most important challenges to commercial uptake of said fuels. Historical evidence allows for a comparison of biomass-based diesel (BBD) and diesel prices, including weekly wholesale commodities prices of FAME biodiesel and energy-adjusted prices of Chicago ultra-low sulfur diesel (ULSD). From Jan. 25, 2007, through Jan. 19, 2023, there were several points in time when biodiesel and ULSD prices were close, however there was not a single week where the biodiesel price was below the ULSD price. The difference in prices was normally $1 to $3 per gallon and at times has ballooned to as much as $5 per gallon. On average, the biodiesel price during this period was $2.12 per gallon above the ULSD price. This difference is 110 percent of the ULSD price, so biodiesel was on average more than twice as expensive as ULSD. Gerveni, M., T. Hubbs and S. Irwin. "Biodiesel and Renewable Diesel: It's All About the Policy." *Farmdoc daily* (13):27, Department of Agricultural and Consumer Economics, University of Illinois at Urbana-Champaign, Feb. 15, 2023.

It is a specific object of the present disclosure to provide renewable drop-in fuel blends that approximate the requirement or characteristics specified for diesel fuels and referenced also to biodiesels, most importantly the cetane number, cloud point, density, kinematic viscosity, and heat value as described below. Additional exemplary ranges and values for each of these characteristics of the drop-in fuel blends of the present technology are provided below in Section IV. Fuel Blend Compositions and Methods of Creation Thereof.

In some embodiments, the present disclosure provides a renewable drop-in fuel blend with a cloud point ranging from 6.5° C. to −40° C. (or 279.65K to 233.15K) when measured according to ASTM D 5771 2017. These values can vary according to local conditions (e.g., air temperatures). See, e.g, EN 590 Diesel Fuel and Test Methods (2005) TABLE 5.2 cited by DIESEL FUEL TECHNICAL REVIEW (2007).

As a note on biodiesel, typical cloud point values for B20 fuel is an average of −12.6° C. See National Renewable Energy Laboratory (NREL), Biodiesel Cloud Point Specifications and Testing, page 8.

In some embodiments, the present disclosure provides a renewable drop-in fuel blend with a cetane number of >=50 (See, e.g., EN 590 Diesel Fuel and Test Methods (2005) cited by DIESEL FUEL TECHNICAL REVIEW, 2007 Chevron. "Better if 50-55." Rating Diesel: Understanding cetane numbers Chip-Express. www.chipexpress.com/articles/rating-diesel-understanding-cetane-numbers/#:~:text=If%20it%20has%20a%20high,powerfully%20while%20producing%20less%20emissions).

As a note on cetane number: Annona cetane number: 52. Senthil Ramalingam et al. (2014). Typical Cetane Values Biodiesel average 55: diesel average 44. Table II.E.1-1. A comprehensive analysis of biodiesel impact on exhaust emissions (2002).

In some embodiments, the present disclosure provides a renewable drop-in fuel blend with a density at 15° C. of 820-845 kg/m3. See, e.g., EN 590 Diesel Fuel and Test Methods (2005) cited by DIESEL FUEL TECHNICAL REVIEW, 2007 Chevron. Fuel Densities and Specific Volumes Engineering ToolBox. Diesel1D[1]@15C 849 kg/m3 Diesel 2D[1] 874 kg/m3 at 15° C. Diesel Fuels USA Fuels of said composition is within a range of 770-790 kg/m$^3$ measured according to EN ISO 12185.

As a note on biodiesel density: Annona biodiesel density at 15 C is 872 kg/m3 (Senthil Ramalingam et al. (2014)).

In some embodiments, the present disclosure provides a renewable drop-in fuel blend with a heat value of 39.47-43 MJ/kg.

As a note on biodiesel heat value: Annona biodiesel heat value: 39.57 MJ/kg (Senthil Ramalingam et al. (2014)).

In some embodiments, the present disclosure provides a renewable drop-in fuel blend with a kinematic viscosity of 2.0-4.5 cSt at 40° C. See, e.g., Table 5.3, page 48 EN 590 Diesel Fuel and Test Methods (2005) by DIESEL FUEL TECHNICAL REVIEW, 2007 Chevron.

As a note on biodiesel, Annona kinematic viscosity is 4.2 cSt at 40° C. (Senthil Ramalingam et al. (2014)).

Additional information relating to the properties of biodiesel and biodiesel blends can be found in Tikendra Nath Verma et al. (2021) (A comprehensive review of the influence of physicochemical properties of biodiesel on combustion characteristics, engine performance and emissions. Annona methyl ester heat value 41.1 MJ/k; kinetic viscosity 4.2 cSt @40C) and in Senthil Ramalingam et al (2014) (Influence of compression ratio on the performance and emission characteristics of Annona methyl ester operated DI diesel engines. Kinematic viscosity cSt at 40 C 5.18; heat value MJ/kg 39.57; density @15C kg/lt 0.872; cetane number 52).

It is a specific object of the present invention to meet the requirements specified for ASTMD7467, ASTM B21 B80 S15, European Standard EN14214:2012+A1:2014 and Indonesian Standard SNI 7182.

The methods of the present disclosure are based on blending select vegetable oils and biodiesels (obtained from different feedstocks), renewable diesels and biofuels in the absence of fossil fuels. In evaluating the cetane number, cloud point, density, kinetic viscosity, and heat value, it was found that a renewable drop-in fuel blend composition, as shown in, for example, Example 1, provides similar physical-chemical characteristics as compared to published values for blends containing petrodiesel. Broadly speaking, the process for designing the drop-in fuel blends is as follows: (i) Identify the physical characteristic values that meet the standards for each specific diesel fuel use; (ii) select available components that have the potential to reach said physical characteristic values in the final product; (iii) determine quantities of selected components to reach the required physical characteristic values using an appropriate software program (e.g., Microsoft Solver); (iv) further vary the amounts to minimize cost using an appropriate software program (e.g., Microsoft Solver); (v) mix/blend the components in mass quantities/proportions as per the requirements of the process; (vi) filter mixed components; and (vii) establish a quarantine for analysis, quality assurance and to ensure compliance with generally accepted standards. In some embodiments, the software program employed in the methods of the present technology is Microsoft Solver. Numerous other commercial or free open-source software applications may be used for linear programming (LP). In practice, where typical LP models may involve thousands of variables and constraints, the computer is the only viable venue for solving LP problems. Two commonly used software systems: Excel Solver and AMPL. SOLVER is particularly appealing to spreadsheet users. AMPL is an algebraic modeling language that, like all higher-order programming languages, requires more expertise. Nevertheless, AMPL, and similar languages offer great modeling flexibility. Both AMPL and Solver can handle integer and nonlinear problems. Taha, H. A. (2017:52). Operations Research. An Introduction. 10 Th Edition. Global Edition. Pearson Education Limited. Solver is an add-in for Microsoft Excel that allows the user to optimize the value in a particular cell by allowing the program to change values in other cells. This is useful to make decisions in an environment where the decision maker wants to maximize profit or minimize costs, for example. The program is able to adapt to a variety of situations, and it is useful in many financial situations. Solver is a tool for data analysis. It gives the user peace of mind with the assertion that a particular decision is the optimal one with respect to a defined output. Cortright, C. (2023:1). Solver in Excel. Optimize Financial Decisions using Analytics. BABSON/Stephen D. Cutler Center for Investment and Finance. Babson Perk, MA, USA. Reproducing the drop-in fuel blends described herein is within the capabilities of those skilled in the art. Those of skill in the art having knowledge of linear programming will appreciate that the drop-in biodiesel fuel blends of the present technology can be produced with the use of an appropriate software program (e.g., Microsoft Solver) to design new formulas based on the fuel blend ingredients described herein.

In the drop-in biodiesel fuel blends of the present technology, the different feedstock containing oils and fats of different biological origin and waste materials and processing conditions affect the characteristics of the final product such as cloud point, density, kinetic viscosity, energy density (heat value), cetane number. The same variation in the characteristics of the final product occurs depending on the bio-alcohol employed in the trans esterification reaction; typically, bioethanol is used in the U.S. and in other countries.

In the drop-in biodiesel fuel blends of the present technology, the desired characteristics (technical constraints/requirements: density, kinematic viscosity, heat value, cetane number, cloud point among others) of the drop-in fuel are first established by aiming for the characteristic values or ranges suggested by the standards available. The mass quantity of each component of the drop-in fuels of the present technology that will provide the target value for each property is reached by going through a process of initial selection of each possible component and the proper amount of each is determined using an appropriate software program. The optimal mix is reached by blending adequate amounts of suitable biodiesels/biofuels of different origins, with no petrodiesel added as determined by the selection procedure.

It is another specific object of the present disclosure to provide a drop-in fuel blend composition useful as a diesel fuel or a diesel fuel component. The renewable drop-in fuel blend process uses B100 biodiesels made using less expensive feedstocks (e.g., Karanja oil (*Pongamia pinnata*), Jatropha C. oil). Such B100 biodiesel must meet the ASTM standards, and is the blend-stock for the products disclosed herein. It does not matter whether it was made using a homogeneous catalyst, heterogeneous catalyst, conventional method or modern methods of oil/fat trans-esterification to Fatty Acid Methyl Ester (FAME)/Fatty Acid Ethyl Ester (FAEE). Biodiesels can be made using, for example, Karanja oil or Jatropha C. oil. The lower alcohols used must not be derived from fossil sources. The process can take place either as a batch or continuous process.

In order to reach the desired characteristics for the drop-in fuel blends of the present disclosure, the following restrictions/limits are imposed on the software program or process for determining fuel blend component quantity: refined Jatropha oil <=0.020, Diesel fuel No. 2,=0.00 sweet orange peel oil <=0.020, biodiesel Jatropha @100%<=0.700, biobutanol, <=0.0200, Diesel fuel No. 1<=0.000, triacetin=0.031, waste cooking oil biodiesel @100%,=0.030, Fischer-Tropsch diesel fuel <=0.000*, hydrotreated vegetable oil, <=0.070, palm oil biodiesel @100%, <=0.045, linseed oil biodiesel @100%<=0.000, turpentine oil <=0.09. *Note these components can be included once the price is such that a fuel blend of the present technology can be competitively priced with other fuel blends. The same caveat applies to Karanja oil biodiesel.

The present disclosure describes specific combinations of vegetable oils, renewable biodiesel (e.g., Fischer-Tropsch Diesel Fuel and HVO's) and biofuels in the drop-in fuel blend compositions with no petrodiesel, which have the required cetane number, cloud point, density, kinematic viscosity, and heat value for a drop-in fuel, along with a low manufacturing cost. The physical characteristics of the drop-in fuel blends are comparable to those of a high-quality diesel fuel or diesel fuel component, and the drop-in fuel blends have a zero fossil carbon footprint. It was also found that the process for generating fuel blends is flexible and can achieve multiple tailor-made formulations. Therefore, the present disclosure describes a system that allows for variation in multiple components or groups of components in the drop-in fuel blends to optimize the characteristics of the final mixture including: cetane number, cloud point, density, kinematic viscosity, heat value, and manufacturing cost, all while maintaining a zero fossil carbon footprint.

The drop-in fuel blends of the present technology have comparable properties to those of conventional diesel, as are described in Ciolkosz, D. (2016), "What's So Different About Biodiesel Fuel?"

Feedstocks of biological origin or renewable feedstocks refers to feedstock derived from biological material, as opposed to inorganic material. The foregoing description shall be considered as merely illustrative of the principles of the present invention, and not in limitation thereof.

The primary requirement for the diesel cycle engine, thermal turbines using Rankine and Brayton cycles, and other diesel combustion apparatuses (e.g., power/heat boilers and diesel turbines) to not be banned from commercial use is for them to burn a fuel that does not contain petrodiesel. This requires adopting a drop-in fuel biodiesel blend with no fossil fuel and physical characteristics that conform to ASTM and other relevant standards, thereby allowing diesel engines to operate efficiently without generating a fossil carbon footprint. This need is met by the presently disclosed drop-in fuel blend formulations, which can be tested in such engines.

Comparison to Indonesian Characteristics and Standards:

Restrictions/limits of technical requirements based on Hermawan Febriansyah, Fajar Budi Utomo, and Suminto Suminto (2020), "The Readiness of Indonesia to Implement Blended Biodiesel B30," include the following: density<=0.890 kg/L, kinematic viscosity <=6.000 cSt, cetane number >=50.000. The heat value of >=42.000 MJ/kg and cloud point of <=273 K are set by the inventors.

The technical requirements and limits above, which are stated for a blended biodiesel B30 (70% petrodiesel), are reached with the presently disclosed drop-in fuel blend compositions, which instead of 30% biodiesel have 81% pure biodiesel, 19% biofuels, and no petrodiesel. The drop-in fuel blend compositions of the present technology possess equivalent or improved characteristics as compared to a mixture containing 30% biodiesel and 70% petrodiesel (such as the Indonesian standard), while containing 81% biodiesel, 19% biofuels and renewable diesels and no petrodiesel.

IV. Fuel Blend Compositions and Methods of Creation Thereof

In one aspect, the present disclosure provides for fuel blends, and methods of making the same, with no fossil carbon and which can be used as drop-in fuels. In some embodiments, the fuel blends of the present technology can be used with various types of engines, including diesel engines, thermal turbines, jet engines, power boilers, heat boilers, and other combustion apparatuses that use diesel.

Any suitable methods can be used to blend the components of the disclosed fuels. One of ordinary skill in the art would appreciate that the components described herein can be mixed using any appropriate technology to create homogenous blends, and that the various components can be mixed in any order.

In one aspect, the fuel blends of the present technology include quaternary fuel blends comprising a mixture of one or more biofuels, one or more plant oils, one or more biodiesels, and one or more renewable diesels, wherein the fuel blend does not comprise fossil fuel-derived carbon. In some embodiments, the one or more biofuels are selected from the group consisting of: 1-propanol; 1-butanol; triacetin; and ethanol. In some embodiments, the one or more plant oils are selected from the group consisting of: sweet orange peel oil; turpentine oil; and refined degummed de-acidified Jatropha oil. In some embodiments, the one or more biodiesels are selected from the group consisting of: Jatropha oil derived biodiesel; waste cooking oil derived biodiesel; waste transformer oil derived biodiesel; palm oil derived biodiesel; and linseed oil derived biodiesel. In some embodiments, the renewable diesel is a Fischer-Tropsch diesel fuel and/or a hydrotreated vegetable oil. In some embodiments, the fuel blend does not comprise fossil fuel derived carbon. In some embodiments, the fuel blend has a higher relative oxygen content than comparable fuel blends comprising petrodiesel. In some embodiments, the higher relative oxygen content of the disclosed fuel blends results in fewer emissions when burned compared to similar fuel blends comprising petrodiesel.

In some embodiments the one or more biofuels are triacetin and 1-biobutanol. In some embodiments, the triacetin is about 1% to about 5% of the mass of the fuel blend. In some embodiments, the triacetin is about 1% of the mass of the fuel blend. In some embodiments, the triacetin is about 1.5% of the mass of the fuel blend. In some embodiments, the triacetin is about 2% of the mass of the fuel blend. In some embodiments, the triacetin is about 2.1% of the mass of the fuel blend. In some embodiments, the triacetin is about 2.2% of the mass of the fuel blend. In some embodiments, the triacetin is about 2.3% of the mass of the fuel blend. In some embodiments, the triacetin is about 2.4% of the mass of the fuel blend. In some embodiments, the triacetin is about 2.5% of the mass of the fuel blend. In some embodiments, the triacetin is about 2.6% of the mass of the fuel blend. In some embodiments, the triacetin is about 2.7% of the mass of the fuel blend. In some embodiments, the triacetin is about 2.8% of the mass of the fuel blend. In some embodiments, the triacetin is about 2.9% of the mass of the fuel blend. In some embodiments, the triacetin is about 3% of the mass of the fuel blend. In some embodiments, the triacetin is about 3.1% of the mass of the fuel blend. In some embodiments, the triacetin is about 3.2% of the mass of the fuel blend. In some embodiments, the triacetin is about 3.3% of the mass of the fuel blend. In some embodiments, the triacetin is about 3.4% of the mass of the fuel blend. In some embodiments, the triacetin is about 3.5% of the mass of the fuel blend. In some embodiments, the triacetin is about 3.6% of the mass of the fuel blend. In some embodiments, the triacetin is about 3.7% of the mass of the fuel blend. In some embodiments, the triacetin is about 3.8% of the mass of the fuel blend. In some embodiments, the triacetin is about 3.9% of the mass of the fuel blend. In some embodiments, the triacetin is about 4% of the mass of the fuel blend. In some embodiments, the triacetin is about 4.1% of the mass of the fuel blend. In some embodiments, the triacetin is about 4.5% of the mass of the fuel blend. In some embodiments, the triacetin is about 5% of the mass of the fuel blend. In some embodiments, the 1-biobutanol is about 0.1% to about 4% of the mass of the fuel blend. In some embodiments, the 1-biobutanol is about 0.1% of the mass of the fuel blend. In some embodiments, the 1-biobutanol is about 0.5% of the mass of the fuel blend. In some embodiments, the 1-biobutanol is about 1% of the mass of the fuel blend. In some embodiments, the 1-biobutanol is about 1.1% of the mass of the fuel blend. In some embodiments, the 1-biobutanol is about 1.2% of the mass of the fuel blend. In some embodiments, the 1-biobutanol is about 1.3% of the mass of the fuel blend. In some embodiments, the 1-biobutanol is about 1.4% of the mass of the fuel blend. In some embodiments, the 1-biobutanol is about 1.5% of the mass of the fuel blend. In some embodiments, the 1-biobutanol is about 2% of the mass of the fuel blend. In some embodiments, the 1-biobutanol is about 1.6% of the mass of the fuel blend. In some embodiments, the 1-biobutanol is about 1.7% of the mass of the fuel blend. In some embodiments, the 1-biobutanol is about 1.8% of the mass of the fuel blend. In some embodiments, the 1-biobutanol is about 1.9% of the mass of the fuel blend. In some embodiments, the 1-biobutanol is about 2% of the mass of the fuel blend. In some embodiments, the 1-biobutanol is about 2.1% of the mass of the fuel blend. In some embodiments, the 1-biobutanol is about 2% of the mass of the fuel blend. In some embodiments, the 1-biobutanol is about 2.2% of the mass of the fuel blend. In some embodiments, the 1-biobutanol is about 2.3% of the mass of the fuel blend. In some embodiments, the 1-biobutanol is about 2.4% of the mass of the fuel blend. In some embodiments, the 1-biobutanol is about 2.5% of the mass of the fuel blend. In some embodiments, the 1-biobutanol is about 2.6% of the mass of the fuel blend. In some embodiments, the 1-biobutanol is about 2.7% of the mass of the fuel blend. In some embodiments, the 1-biobutanol is about 2.8% of the mass of the fuel blend. In some embodiments, the 1-biobutanol is about 2.9% of the mass of the fuel blend. In some embodiments, the 1-biobutanol is about 3% of the mass of the fuel blend. In some embodiments, the 1-biobutanol is about 3.5% of the mass of the fuel blend. In some embodiments, the 1-biobutanol is about 4% of the mass of the fuel blend.

In some embodiments, the one or more plant oils are turpentine oil and refined degummed de-acidified Jatropha oil. In some embodiments, the refined degummed de-acidified Jatropha oil is about 0.1% to about 4% of the mass of the fuel blend. In some embodiments, the refined degummed de-acidified Jatropha oil is about 0.1% of the mass of the fuel blend. In some embodiments, the refined degummed de-acidified Jatropha oil is about 0.5% of the mass of the fuel blend. In some embodiments, the refined degummed de-acidified Jatropha oil is about 1% of the mass of the fuel blend. In some embodiments, the refined degummed de-acidified Jatropha oil is about 1.1% of the mass of the fuel blend. In some embodiments, the refined degummed deacidified Jatropha oil is about 1.2% of the mass of the fuel blend. In some embodiments, the refined degummed deacidified Jatropha oil is about 1.3% of the mass of the fuel blend. In some embodiments, the refined degummed deacidified Jatropha oil is about 1.4% of the mass of the fuel blend. In some embodiments, the refined degummed deacidified Jatropha oil is about 1.5% of the mass of the fuel blend. In some embodiments, the refined degummed deacidified Jatropha oil is about 1.6% of the mass of the fuel blend. In some embodiments, the refined degummed deacidified Jatropha oil is about 1.7% of the mass of the fuel blend. In some embodiments, the refined degummed deacidified Jatropha oil is about 1.8% of the mass of the fuel blend. In some embodiments, the refined degummed deacidified Jatropha oil is about 1.9% of the mass of the fuel blend. In some embodiments, the refined degummed deacidified Jatropha oil is about 2% of the mass of the fuel blend. In some embodiments, the refined degummed deacidified Jatropha oil is about 2.1% of the mass of the fuel blend. In some embodiments, the refined degummed deacidified Jatropha oil is about 2.2% of the mass of the fuel blend. In some embodiments, the refined degummed deacidified Jatropha oil is about 2.3% of the mass of the fuel blend. In some embodiments, the refined degummed deacidified Jatropha oil is about 2.4% of the mass of the fuel blend. In some embodiments, the refined degummed deacidified Jatropha oil is about 2.5% of the mass of the fuel blend. In some embodiments, the refined degummed deacidified Jatropha oil is about 2.6% of the mass of the fuel blend. In some embodiments, the refined degummed deacidified Jatropha oil is about 2.7% of the mass of the fuel blend. In some embodiments, the refined degummed deacidified Jatropha oil is about 2.8% of the mass of the fuel blend. In some embodiments, the refined degummed deacidified Jatropha oil is about 2.9% of the mass of the fuel blend. In some embodiments, the refined degummed deacidified Jatropha oil is about 3.0% of the mass of the fuel blend. In some embodiments, the refined degummed deacidified Jatropha oil is about 3.5% of the mass of the fuel blend. In some embodiments, the refined degummed deacidified Jatropha oil is about 4% of the mass of the fuel blend. In some embodiments, the turpentine oil is about 1.0% to about 10.5% of the mass fuel blend. In some embodiments, the turpentine oil is about 5.0% to about 10.5% of the mass fuel blend. In some embodiments, the turpentine oil is about 6.5% to about 10.5% of the mass fuel blend. In some embodiments, the turpentine oil is about 6.5% of the mass of the fuel blend. In some embodiments, the turpentine oil is about 7% of the mass of the fuel blend. In some embodiments, the turpentine oil is about 7.5% of the mass of the fuel blend. In some embodiments, the turpentine oil is about 7.6% of the mass of the fuel blend. In some embodiments, the turpentine oil is about 7.7% of the mass of the fuel blend. In some embodiments, the turpentine oil is about 7.8% of the mass of the fuel blend. In some embodiments, the turpentine oil is about 7.9% of the mass of the fuel blend. In some embodiments, the turpentine oil is about 8% of the mass of the fuel blend. In some embodiments, the turpentine oil is about 8.1% of the mass of the fuel blend. In some embodiments, the turpentine oil is about 8.2% of the mass of the fuel blend. In some embodiments, the turpentine oil is about 8.3% of the mass of the fuel blend. In some embodiments, the turpentine oil is about 8.4% of the mass of the fuel blend. In some embodiments, the turpentine oil is about 8.47% of the mass of the fuel blend. In some embodiments, the turpentine oil is about 8.6% of the mass of the fuel blend. In some embodiments, the turpentine oil is about 8.7% of the mass of the fuel blend. In some embodiments, the turpentine oil is about 8.8% of the mass of the fuel blend. In some embodiments, the turpentine oil is about 8.9% of the mass of the fuel blend. In some embodiments, the turpentine oil is about 9% of the mass of the fuel blend. In some embodiments, the turpentine oil is about 9.1% of the mass of the fuel blend. In some embodiments, the turpentine oil is about 9.2% of the mass of the fuel blend. In some embodiments, the turpentine oil is about 9.3% of the mass of the fuel blend. In some embodiments, the turpentine oil is about 9.4% of the mass of the fuel blend. In some embodiments, the turpentine oil is about 9.5% of the mass of the fuel blend. In some embodiments, the turpentine oil is about 10% of the mass of the fuel blend. In some embodiments, the turpentine oil is about 10.5% of the mass of the fuel blend.

In some embodiments, the one or more biodiesels are Jatropha oil derived biodiesel, waste cooking oil derived biodiesel, waste transformer oil derived biodiesel, and palm oil derived biodiesel. In some embodiments, the Jatropha oil derived biodiesel is about 61.5% of the mass of the fuel blend. In some embodiments, the Jatropha oil derived biodiesel is about 62% of the mass of the fuel blend. In some embodiments, the Jatropha oil derived biodiesel is about 62.5% of the mass of the fuel blend. In some embodiments, the Jatropha oil derived biodiesel is about 62.6% of the mass of the fuel blend. In some embodiments, the Jatropha oil derived biodiesel is about 62.7% of the mass of the fuel blend. In some embodiments, the Jatropha oil derived biodiesel is about 62.8% of the mass of the fuel blend. In some embodiments, the Jatropha oil derived biodiesel is about 62.9% of the mass of the fuel blend. In some embodiments, the Jatropha oil derived biodiesel is about 63% of the mass of the fuel blend. In some embodiments, the Jatropha oil derived biodiesel is about 63.1% of the mass of the fuel blend. In some embodiments, the Jatropha oil derived biodiesel is about 63.2% of the mass of the fuel blend. In some embodiments, the Jatropha oil derived biodiesel is about 63.3% of the mass of the fuel blend. In some embodiments, the Jatropha oil derived biodiesel is about 63.4% of the mass of the fuel blend. In some embodiments, the Jatropha oil derived biodiesel is about 63.5% of the mass of the fuel blend. In some embodiments, the Jatropha oil derived biodiesel is about 63.52% of the mass of the fuel blend. In some embodiments, the Jatropha oil derived biodiesel is about 63.6% of the mass of the fuel blend. In some embodiments, the Jatropha oil derived biodiesel is about 63.7% of the mass of the fuel blend. In some embodiments, the Jatropha oil derived biodiesel is about 63.8% of the mass of the fuel blend. In some embodiments, the Jatropha oil derived biodiesel is about 63.9% of the mass of the fuel blend. In some embodiments, the Jatropha oil derived biodiesel is about 64% of the mass of the fuel blend. In some embodiments, the Jatropha oil derived biodiesel is about 64.1% of the mass of the fuel blend. In some embodiments, the Jatropha oil derived biodiesel is about 64.2% of the mass of the fuel blend. In some embodiments, the Jatropha oil derived biodiesel is about 64.3% of the mass of the fuel blend. In some embodiments, the Jatropha oil derived biodiesel is about 64.5% of the mass of the fuel blend. In some embodiments, the Jatropha oil derived biodiesel is about 65% of the mass of the fuel blend. In some embodiments, the Jatropha oil derived biodiesel is about 65.5% of the mass of the fuel blend. In some embodiments, the waste cooking oil derived biodiesel is about 1% to about 99% of the mass of the fuel blend. In some embodiments, the waste cooking oil derived biodiesel is about 1% of the mass of the fuel blend. In some embodiments, the waste cooking oil derived biodiesel is about 1.5% of the mass of the fuel blend. In some embodiments, the waste cooking oil derived biodiesel is about 2% of the mass of the fuel blend. In some embodiments, the waste cooking oil derived biodiesel is about 2.1% of the mass of the fuel blend. In some embodiments, the waste cooking oil derived biodiesel is about 2.2% of the mass of the fuel blend. In some embodiments, the waste cooking oil derived biodiesel is about 2.3% of the mass of the fuel blend. In some embodiments, the waste cooking oil derived biodiesel is about 2.4% of the mass of the fuel blend. In some embodiments, the waste cooking oil derived biodiesel is about 2.5% of the mass of the fuel blend. In some embodiments, the waste cooking oil derived biodiesel is about 2.6% of the mass of the fuel blend. In some embodiments, the waste cooking oil derived biodiesel is about 2.7% of the mass of the fuel blend. In some embodiments, the waste cooking oil derived biodiesel is about 2.8% of the mass of the fuel blend. In some embodiments, the waste cooking oil derived biodiesel is about 2.9% of the mass of the fuel blend. In some embodiments, the waste cooking oil derived biodiesel is about 3% of the mass of the fuel blend. In some embodiments, the waste cooking oil derived biodiesel is about 3.1% of the mass of the fuel blend. In some embodiments, the waste cooking oil derived biodiesel is about 3.2% of the mass of the fuel blend. In some embodiments, the waste cooking oil derived biodiesel is about 3.3% of the mass of the fuel blend. In some embodiments, the waste cooking oil derived biodiesel is about 3.4% of the mass of the fuel blend. In some embodiments, the waste cooking oil derived biodiesel is about 3.5% of the mass of the fuel blend. In some embodiments, the waste cooking oil derived biodiesel is about 3.6% of the mass of the fuel blend. In some embodiments, the waste cooking oil derived biodiesel is about 3.7% of the mass of the fuel blend. In some embodiments, the waste cooking oil derived biodiesel is about 3.8% of the mass of the fuel blend. In some embodiments, the waste cooking oil derived biodiesel is about 3.9% of the mass of the fuel blend. In some embodiments, the waste cooking oil derived biodiesel is about 4% of the mass of the fuel blend. In some embodiments, the waste cooking oil derived biodiesel is about 4.5% of the mass of the fuel blend. In some embodiments, the waste cooking oil derived biodiesel is about 5% of the mass of the fuel blend. In some embodiments, the waste transformer oil derived biodiesel is about 5% of the mass of the fuel blend. In some embodiments, the waste transformer oil derived biodiesel is about 5.5% of the mass of the fuel blend. In some embodiments, the waste transformer oil derived biodiesel is about 6% of the mass of the fuel blend. In some embodiments, the waste transformer oil derived biodiesel is about 6.5% of the mass of the fuel blend. In some embodiments, the waste transformer oil derived biodiesel is about 7% of the mass of the fuel blend. In some embodiments, the waste transformer oil derived biodiesel is about 7.5% of the mass of the fuel blend. In some embodiments, the waste transformer oil derived biodiesel is about 8% of the mass of the fuel blend. In some embodiments, the waste transformer oil derived biodiesel is about 8.5% of the mass of the fuel blend. In some embodiments, the waste transformer oil derived biodiesel is about 9% of the mass of the fuel blend. In some embodiments, the waste transformer oil derived biodiesel is about 9.1% of the mass of the fuel blend. In some embodiments, the waste transformer oil derived biodiesel is about 9.2% of the mass of the fuel blend. In some embodiments, the waste transformer oil derived biodiesel is about 9.3% of the mass of the fuel blend. In some embodiments, the waste transformer oil derived biodiesel is about 9.4% of the mass of the fuel blend. In some embodiments, the waste transformer oil derived biodiesel is about 9.5% of the mass of the fuel blend. In some embodiments, the waste transformer oil derived biodiesel is about 9.6% of the mass of the fuel blend. In some embodiments, the waste transformer oil derived biodiesel is about 9.7% of the mass of the fuel blend. In some embodiments, the waste transformer oil derived biodiesel is about 9.8% of the mass of the fuel blend. In some embodiments, the waste transformer oil derived biodiesel is about 9.9% of the mass of the fuel blend. In some embodiments, the waste transformer oil derived biodiesel is about 10% of the mass of the fuel blend. In some embodiments, the waste transformer oil derived biodiesel is about 10.1% of the mass of the fuel blend. In some embodiments, the waste transformer oil derived biodiesel is about 10.2% of the mass of the fuel blend. In some embodiments, the waste transformer oil derived biodiesel is about 10.3% of the mass of the fuel blend. In some embodiments, the waste transformer oil derived biodiesel is about 10.4% of the mass of the fuel blend. In some embodiments, the waste transformer oil derived biodiesel is about 10.5% of the mass of the fuel blend. In some embodiments, the waste transformer oil derived biodiesel is about 10.6% of the mass of the fuel blend. In some embodiments, the waste transformer oil derived biodiesel is about 10.7% of the mass of the fuel blend. In some embodiments, the waste transformer oil derived biodiesel is about 10.8% of the mass of the fuel blend. In some embodiments, the waste transformer oil derived biodiesel is about 10.9% of the mass of the fuel blend. In some embodiments, the waste transformer oil derived biodiesel is about 11% of the mass of the fuel blend. In some embodiments, the waste transformer oil derived biodiesel is about 11.5% of the mass of the fuel blend. In some embodiments, the waste transformer oil derived biodiesel is about 12% of the mass of the fuel blend. In some embodiments, the palm oil derived biodiesel is about 2.5% of the mass of the fuel blend. In some embodiments, the palm oil derived biodiesel is about 3% of the mass of the fuel blend. In some embodiments, the palm oil derived biodiesel is about 3.5% of the mass of the fuel blend. In some embodiments, the palm oil derived biodiesel is about 3.6% of the mass of the fuel blend. In some embodiments, the palm oil derived biodiesel is about 3.7% of the mass of the fuel blend. In some embodiments, the palm oil derived biodiesel is about 3.8% of the mass of the fuel blend. In some embodiments, the palm oil derived biodiesel is about 3.9% of the mass of the fuel blend. In some embodiments, the palm oil derived biodiesel is about 4% of the mass of the fuel blend. In some embodiments, the palm oil derived biodiesel is about 4.1% of the mass of the fuel blend. In some embodiments, the palm oil derived biodiesel is about 4.2% of the mass of the fuel blend. In some embodiments, the palm oil derived biodiesel is about 4.3% of the mass of the fuel blend. In some embodiments, the palm oil derived biodiesel is about 4.4% of the mass of the fuel blend. In some embodiments, the palm oil derived biodiesel is about 4.48% of the mass of the fuel blend. In some embodiments, the palm oil derived biodiesel is about 4.5% of the mass of the fuel blend. In some embodiments, the palm oil derived biodiesel is about 4.6% of the mass of the fuel blend. In some embodiments, the palm oil derived biodiesel is about 4.7% of the mass of the fuel blend. In some embodiments, the palm oil derived biodiesel is about 4.8% of the mass of the fuel blend. In some embodiments, the palm oil derived biodiesel is about 4.9% of the mass of the fuel blend. In some embodiments, the palm oil derived biodiesel is about 5.0% of the mass of the fuel blend. In some embodiments, the palm oil derived biodiesel is about 5.1% of the mass of the fuel blend. In some embodiments, the palm oil derived biodiesel is about 5.2% of the mass of the fuel blend. In some embodiments, the palm oil derived biodiesel is about 5.3% of the mass of the fuel blend. In some embodiments, the palm oil derived biodiesel is about 5.4% of the mass of the fuel blend. In some embodiments, the palm oil derived biodiesel is about 5.5% of the mass of the fuel blend. In some embodiments, the palm oil derived biodiesel is about 6.0% of the mass of the fuel blend.

In some embodiments, the one or more renewable diesels is a hydrotreated vegetable oil. In some embodiments, the hydrotreated vegetable oil is about 1.5% to about 99% of the mass of the fuel blend, or any value or range in between such values. For example, in some embodiments, the hydrotreated vegetable oil is about 1.5% of the mass of the fuel blend. In some embodiments, the hydrotreated vegetable oil is about 2.0% of the mass of the fuel blend. In some embodiments, the hydrotreated vegetable oil is about 2.5% of the mass of the fuel blend. In some embodiments, the hydrotreated vegetable oil is about 2.6% of the mass of the fuel blend. In some embodiments, the hydrotreated vegetable oil is about 2.7% of the mass of the fuel blend. In some embodiments, the hydrotreated vegetable oil is about 2.8% of the mass of the fuel blend. In some embodiments, the hydrotreated vegetable oil is about 2.9% of the mass of the fuel blend. In some embodiments, the hydrotreated vegetable oil is about 3.0% of the mass of the fuel blend. In some embodiments, the hydrotreated vegetable oil is about 3.1% of the mass of the fuel blend. In some embodiments, the hydrotreated vegetable oil is about 3.2% of the mass of the fuel blend. In some embodiments, the hydrotreated vegetable oil is about 3.3% of the mass of the fuel blend. In some embodiments, the hydrotreated vegetable oil is about 3.4% of the mass of the fuel blend. In some embodiments, the hydrotreated vegetable oil is about 3.43% of the mass of the fuel blend. In some embodiments, the hydrotreated vegetable oil is about 3.5% of the mass of the fuel blend. In some embodiments, the hydrotreated vegetable oil is about 3.6% of the mass of the fuel blend. In some embodiments, the hydrotreated vegetable oil is about 3.7% of the mass of the fuel blend. In some embodiments, the hydrotreated vegetable oil is about 3.8% of the mass of the fuel blend. In some embodiments, the hydrotreated vegetable oil about 3.9% of the mass of the fuel blend. In some embodiments, the hydrotreated vegetable oil is about 4.0% of the mass of the fuel blend. In some embodiments, the hydrotreated vegetable oil is about 4.1% of the mass of the fuel blend. In some embodiments, the hydrotreated vegetable oil is about 4.2% of the mass of the fuel blend. In some embodiments, the hydrotreated vegetable oil is about 4.3% of the mass of the fuel blend. In some embodiments, the hydrotreated vegetable oil is about 4.4% of the mass of the fuel blend. In some embodiments, the hydrotreated vegetable oil is about 4.5% of the mass of the fuel blend. In some embodiments, the hydrotreated vegetable oil is about 5.0% of the mass of the fuel blend. In some embodiments, the hydrotreated vegetable oil is about 5.5% of the mass of the fuel blend. In some embodiments, the hydrotreated vegetable oil is about 6.0% of the mass of the fuel blend. In some embodiments, the hydrotreated vegetable oil is about 7.0% of the mass of the fuel blend. In some embodiments, the hydrotreated vegetable oil is about 8.0% of the mass of the fuel blend. In some embodiments, the hydrotreated vegetable oil is about 9.0% of the mass of the fuel blend. In some embodiments, the hydrotreated vegetable oil is about 10.0% of the mass of the fuel blend. In some embodiments, the hydrotreated vegetable oil is about 15.0% of the mass of the fuel blend. In some embodiments, the hydrotreated vegetable oil is about 20.0% of the mass of the fuel blend. In some embodiments, the hydrotreated vegetable oil is about 25.0% of the mass of the fuel blend. In some embodiments, the hydrotreated vegetable oil is about 30.0% of the mass of the fuel blend. In some embodiments, the hydrotreated vegetable oil is about 35.0% of the mass of the fuel blend. In some embodiments, the hydrotreated vegetable oil is about 40.0% of the mass of the fuel blend. In some embodiments, the hydrotreated vegetable oil is about 45.0% of the mass of the fuel blend. In some embodiments, the hydrotreated vegetable oil is about 50.0% of the mass of the fuel blend. In some embodiments, the hydrotreated vegetable oil is about 55.0% of the mass of the fuel blend. In some embodiments, the hydrotreated vegetable oil is about 60.0% of the mass of the fuel blend. In some embodiments, the hydrotreated vegetable oil is about 65.0% of the mass of the fuel blend. In some embodiments, the hydrotreated vegetable oil is about 70.0% of the mass of the fuel blend. In some embodiments, the hydrotreated vegetable oil is about 75.0% of the mass of the fuel blend. In some embodiments, the hydrotreated vegetable oil is about 80.0% of the mass of the fuel blend. In some embodiments, the hydrotreated vegetable oil is about 81.0% of the mass of the fuel blend. In some embodiments, the hydrotreated vegetable oil is about 82.0% of the mass of the fuel blend. In some embodiments, the hydrotreated vegetable oil is about 83.0% of the mass of the fuel blend. In some embodiments, the hydrotreated vegetable oil is about 84.0% of the mass of the fuel blend. In some embodiments, the hydrotreated vegetable oil is about 85.0% of the mass of the fuel blend. In some embodiments, the hydrotreated vegetable oil is about 86.0% of the mass of the fuel blend. In some embodiments, the hydrotreated vegetable oil is about 87.0% of the mass of the fuel blend. In some embodiments, the hydrotreated vegetable oil is about 88.0% of the mass of the fuel blend. In some embodiments, the hydrotreated vegetable oil is about 89.0% of the mass of the fuel blend. In some embodiments, the hydrotreated vegetable oil is about 90.0% of the mass of the fuel blend. In some embodiments, the hydrotreated vegetable oil is about 91.0% of the mass of the fuel blend. In some embodiments, the hydrotreated vegetable oil is about 92.0% of the mass of the fuel blend. In some embodiments, the hydrotreated vegetable oil is about 93.0% of the mass of the fuel blend. In some embodiments, the hydrotreated vegetable oil is about 94.0% of the mass of the fuel blend. In some embodiments, the hydrotreated vegetable oil is about 95.0% of the mass of the fuel blend. In some embodiments, the hydrotreated vegetable oil is about 96.0% of the mass of the fuel blend. In some embodiments, the hydrotreated vegetable oil is about 97.0% of the mass of the fuel blend. In some embodiments, the hydrotreated vegetable oil is about 98.0% of the mass of the fuel blend. In some embodiments, the hydrotreated vegetable oil is about 99.0% of the mass of the fuel blend.

In some embodiments, triacetin is about 3.1% of the mass of the fuel blend, 1-biobutanol is about 2% of the mass of the fuel blend, refined degummed de-acidified Jatropha oil is about 2% of the mass of the fuel blend, turpentine oil is about 8.47% of the mass of the fuel blend, Jatropha oil derived biodiesel is about 63.52% of the mass of the fuel blend, waste cooking oil derived biodiesel is about 3% of the mass of the fuel blend, waste transformer oil derived biodiesel is about 10% of the mass of the fuel blend, palm oil derived biodiesel is about 4.48% of the mass of the fuel blend, and hydrotreated vegetable oil is about 3.43% of the mass of the fuel blend.

In some embodiments, the cetane value of the fuel blend can be adjusted by changing the abundance of one or more components of the blend. In some embodiments, the fuel blend comprises a cetane value (or number) of about 40 to about 91, or any value or range in between such values. For example, in some embodiments, the fuel blend comprises a cetane value of about 50 to about 91. In some embodiments, the fuel blend has a cetane value of about 40. In some embodiments, the fuel blend has a cetane value of about 45. In some embodiments, the fuel blend has a cetane value of about 50. In some embodiments, the fuel blend has a cetane value that is greater than or equal to 50. In some embodiments, the fuel blend has a cetane value of about 55. In some embodiments, the fuel blend has a cetane value of about 60. In some embodiments, the fuel blend has a cetane value of about 65. In some embodiments, the fuel blend has a cetane value of about 70. In some embodiments, the fuel blend has a cetane value of about 75. In some embodiments, the fuel blend has a cetane value of about 80. In some embodiments, the fuel blend has a cetane value of about 85. In some embodiments, the fuel blend has a cetane value of about 90. In some embodiments, the fuel has a cetane value of about 91. In some embodiments, the fuel blend comprises a cetane value of: about 40; about 41; about 42; about 43; about 44; about 45; about 46; about 47; about 48; about 49; about 50; about 50.01; about 50.02; about 50.03; about 50.04; about 50.05; about 50.06; about 50.07; about 50.08; about 50.09; about 50.1; about 50.5; about 50.75; about 51; about 51.01; about 51.02; about 51.03; about 51.04; about 51.05; about 51.06; about 51.07; about 51.08; about 51.09; about 51.1; about 51.5; about 51.75; about 52; 52.01; about 52.02; about 52.03; about 52.04; about 52.05; about 52.06; about 52.07; about 52.08; about 52.09; about 52.1; about 52.5; about 52.75; about 53; about 53.01; about 53.02; about 53.03; about 53.04; about 53.05; about 53.06; about 53.07; about 53.08; about 53.09; about 53.1; about 53.5; about 53.75; about 54; about 54.01; about 54.02; about 54.03; about 54.04; about 54.05; about 54.06; about 54.07; about 54.08; about 54.09; about 54.1; about 54.5; about 54.75; about 55; about 55.01; about 55.02; about 55.03; about 55.04; about 55.05; about 55.06; about 55.07; about 55.08; about 55.09; about 55.1; about 55.5; about 55.75; about 56; about 56.01; about 56.02; about 56.03; about 56.04; about 56.05; about 56.06; about 56.07; about 56.08; about 56.09; about 56.1; about 56.5; about 56.75; about 57; about 57.01; about 57.02; about 57.03; about 57.04; about 57.05; about 57.06; about 57.07; about 57.08; about 57.09; about 57.1; about 57.5; about 57.75; about 58; about 58.01; about 58.02; about 58.03; about 58.04; about 58.05; about 58.06; about 58.07; about 58.08; about 58.09; about 58.1; about 58.5; about 58.75; about 59; about 59.01; about 59.02; about 59.03; about 59.04; about 59.05; about 59.06; about 59.07; about 59.08; about 59.09; about 59.1; about 59.5; about 59.75; about 60; about 60.01; about 60.02; about 60.03; about 60.04; about 60.05; about 60.06; about 60.07; about 60.08; about 60.09; about 60.1; about 60.5; about 60.75; about 61; about 61.01; about 61.02; about 61.03; about 61.04; about 61.05; about 61.06; about 61.07; about 61.08; about 61.09; about 61.1; about 61.5; about 61.75; about 62; about 62.01; about 62.02; about 62.03; about 62.04; about 62.05; about 62.06; about 62.07; about 62.08; about 62.09; about 62.1; about 62.5; about 62.75; about 63; about 63.01; about 63.02; about 63.03; about 63.04; about 63.05; about 63.06; about 63.07; about 63.08; about 63.09; about 63.1; about 63.5; about 63.75; about 64; about 64.01; about 64.02; about 64.03; about 64.04; about 64.05; about 64.06; about 64.07; about 64.08; about 64.09; about 64.1; about 64.5; about 64.75; about 65; about 65.01; about 65.02; about 65.03; about 65.04; about 65.05; about 65.06; about 65.07; about 65.08; about 65.09; about 65.1; about 65.5; about 65.75; about 66; about 66.01; about 66.02; about 66.03; about 66.04; about 66.05; about 66.06; about 66.07; about 66.08; about 66.09; about 66.1; about 66.5; about 66.75; about 67; about 67.01; about 67.02; about 67.03; about 67.04; about 67.05; about 67.06; about 67.07; about 67.08; about 67.09; about 67.1; about 67.5; about 67.75; about 68; about 68.01; about 68.02; about 68.03; about 68.04; about 68.05; about 68.06; about 68.07; about 68.08; about 68.09; about 68.1; about 68.5; about 68.75; about 69; about 69.01; about 69.02; about 69.03; about 69.04; about 69.05; about 69.06; about 69.07; about 69.08; about 69.09; about 69.1; about 69.5; about 69.75; about 70; about 70.01; about 70.02; about 70.03; about 70.04; about 70.05; about 70.06; about 70.07; about 70.08; about 70.09; about 70.1; about 70.5; about 70.75; about 71; about 71.01; about 71.02; about 71.03; about 71.04; about 71.05; about 71.06; about 71.07; about 71.08; about 71.09; about 71.1; about 71.5; about 71.75; about 72; about 72.01; about 72.02; about 72.03; about 72.04; about 72.05; about 72.06; about 72.07; about 72.08; about 72.09; about 72.1; about 72.5; about 72.75; about 73; about 73.01; about 73.02; about 73.03; about 73.04; about 73.05; about 73.06; about 73.07; about 73.08; about 73.09; about 73.1; about 73.5; about 73.75; about 74; about 74.01; about 74.02; about 74.03; about 74.04; about 74.05; about 74.06; about 74.07; about 74.08; about 74.09; about 74.1; about 74.5; about 74.75; about 75; about 75.01; about 75.02; about 75.03; about 75.04; about 75.05; about 75.06; about 75.07; about 75.08; about 75.09; about 75.1; about 75.5; about 75.75; or about 75 to about 91. In some embodiments, the fuel blend comprises a cetane value of about 76; about 76.01; about 76.02; about 76.03; about 76.04; about 76.05; about 76.06; about 76.07; about 76.08; about 76.09; about 76.1; about 76.5; about 76.75; about 77. In some embodiments, the fuel blend comprises a cetane value of about 77; about 77.01; about 77.02; about 77.03; about 77.04; about 77.05; about 77.06; about 77.07; about 77.08; about 77.09; about 77.1; about 77.5; about 77.75; about 78; about 78.01; about 78.02; about 78.03; about 78.04; about 78.05; about 78.06; about 78.07; about 78.08; about 78.09; about 78.1; about 78.5; about 78.75; about 79; about 79.01; about 79.02; about 79.03; about 79.04; about 79.05; about 79.06; about 79.07; about 79.08; about 79.09; about 79.1; about 79.5; about 79.75; about 80; about 80.01; about 80.02; about 80.03; about 80.04; about 80.05; about 80.06; about 80.07; about 80.08; about 80.09; about 80.1; about 80.5; about 80.75; about 81; about 81.01; about 81.02; about 81.03; about 81.04; about 81.05; about 81.06; about 81.07; about 81.08; about 81.09; about 81.1; about 81.5; about 81.75; about 82; about 82.01; about 82.02; about 82.03; about 82.04; about 82.05; about 82.06; about 82.07; about 82.08; about 82.09; about 82.1; about 82.5; about 82.75; about 83; about 83.01; about 83.02; about 83.03; about 83.04; about 83.05; about 83.06; about 83.07; about 83.08; about 83.09; about 83.1; about 83.5; about 83.75; about 84; about 84.01; about 84.02; about 84.03; about 84.04; about 84.05; about 84.06; about 84.07; about 84.08; about 84.09; about 84.1; about 84.5; about 84.75; about 85; about 85.01; about 85.02; about 85.03; about 85.04; about 85.05; about 85.06; about 85.07; about 85.08; about 85.09; about 85.1; about 85.5; about 85.75; about 86; about 86.01; about 86.02; about 86.03; about 86.04; about 86.05; about 86.06; about 86.07;

about 86.08; about 86.09; about 86.1; about 86.5; about 86.75; about 87; about 87.01; about 87.02; about 87.03; about 87.04; about 87.05; about 87.06; about 87.07; about 87.08; about 87.09; about 87.1; about 87.5; about 87.75; about 88; about 88.01; about 88.02; about 88.03; about 88.04; about 88.05; about 88.06; about 88.07; about 88.08; about 88.09; about 88.1; about 88.5; about 88.75; about 89; about 89.01; about 89.02; about 89.03; about 89.04; about 89.05; about 89.06; about 89.07; about 89.08; about 89.09; about 89.1; about 89.5; about 89.75; about 90; about 90.01; about 90.02; about 90.03; about 90.04; about 90.05; about 90.06; about 90.07; about 90.08; about 90.09; about 90.1; about 90.5; about 90.75; or about 91. In some embodiments, the fuel blend comprises a cetane value that is greater than 91. For example, in some embodiments, the fuel blend comprises a cetane value of about 91.1; about 91.2; about 91.3; about 91.4; about 91.5; about 91.6; about 91.7; about 91.8; about 91.9; about 92; about 92.1; about 92.2; about 92.3; about 92.4; about 92.5; about 92.6; about 92.7; about 92.8; about 92.9; about 93; about 93.1; about 93.2; about 93.3; about 93.4; about 93.5; about 93.6; about 93.7; about 93.8; about 93.9; or about 94.

In some embodiments, the cloud point of the fuel blend can be adjusted by changing the abundance of one or more components of the blend. In some embodiments, changing the abundance of biobutanol, hydrotreated vegetable oil (HVO), and/or wood Kraft turpentine oil changes the cloud point of the fuel blend. In some embodiments, the fuel blend comprises a cloud point of about 275K to about 233.15K, or any value or range in between such values. For example, in some embodiments, the fuel blend comprises a cloud point of about 273.15K to about 233.15K (or about 0° C. to about −40° C.), or any value or range in between such values In some embodiments, the fuel blend comprises a cloud point of about 252K to about 275K. In some embodiments, the fuel blend has a cloud point of about 233.15K (or −40° C.) In some embodiments, the fuel blend has a cloud point of about 234K. In some embodiments, the fuel blend has a cloud point of about 235K. In some embodiments, the fuel blend has a cloud point of about 236K. In some embodiments, the fuel blend has a cloud point of about 237K. In some embodiments, the fuel blend has a cloud point of about 238K. In some embodiments, the fuel blend has a cloud point of about 239K. In some embodiments, the fuel blend has a cloud point of about 240K. In some embodiments, the fuel blend has a cloud point of about 241K. In some embodiments, the fuel blend has a cloud point of about 242K. In some embodiments, the fuel blend has a cloud point of about 243K. In some embodiments, the fuel blend has a cloud point of about 244K. In some embodiments, the fuel blend has a cloud point of about 245K. In some embodiments, the fuel blend has a cloud point of about 246K. In some embodiments, the fuel blend has a cloud point of about 247K. In some embodiments, the fuel blend has a cloud point of about 248K. In some embodiments, the fuel blend has a cloud point of about 249K. In some embodiments, the fuel blend has a cloud point of about 250K. In some embodiments, the fuel blend has a cloud point of about 251K. In some embodiments, the fuel blend has a cloud point of about 252K. In some embodiments, the fuel blend has a cloud point of about 253K. In some embodiments, the fuel blend has a cloud point of about 254K. In some embodiments, the fuel blend has a cloud point of about 255K. In some embodiments, the fuel blend has a cloud point of about 256K. In some embodiments, the fuel blend has a cloud point of about 257K. In some embodiments, the fuel blend has a cloud point of about 258K. In some embodiments, the fuel blend has a cloud point of about 259K. In some embodiments, the fuel blend has a cloud point of about 260K. In some embodiments, the fuel blend has a cloud point of about 261K. In some embodiments, the fuel blend has a cloud point of about 262K. In some embodiments, the fuel blend has a cloud point of about 263K. In some embodiments, the fuel blend has a cloud point of about 264K. In some embodiments, the fuel blend has a cloud point of about 265K. In some embodiments, the fuel blend has a cloud point of about 266K. In some embodiments, the fuel blend has a cloud point of about 267K. In some embodiments, the fuel blend has a cloud point of about 268K. In some embodiments, the fuel blend has a cloud point of about 269K. In some embodiments, the fuel blend has a cloud point of about 270K. In some embodiments, the fuel blend has a cloud point of about 271K. In some embodiments, the fuel blend has a cloud point of about 272K. In some embodiments, the fuel blend has a cloud point of about 273K. In some embodiments, the fuel blend has a cloud point of 273K. In some embodiments, the fuel blend has a cloud point of about 274K. In some embodiments, the fuel blend has a cloud point of about 275K.

In some embodiments, the density of the fuel blend can be adjusted by changing the abundance of one or more components of the blend. In some embodiments, the fuel blend comprises a density about 0.77 kg/L to about 0.90 kg/L, or any value or range in between such values. For example, in some embodiments, the fuel blend comprises a density of about 0.85 kg/L to about 0.89 kg/L. In some embodiments, the fuel blend comprises a density of about 0.78 kg/L to about 0.90 kg/L; or about 0.79 kg/L to about 0.90 kg/L; or about 0.80 kg/L to about 0.90 kg/L; or about 0.81 kg/L to about 0.90 kg/L; or about 0.82 kg/L to about 0.90 kg/L; or about 0.83 kg/L to about 0.90 kg/L; or about 0.84 kg/L to about 0.90 kg/L; or about 0.85 kg/L to about 0.90 kg/L; or about 0.86 kg/L to about 0.90 kg/L; or about 0.87 kg/L to about 0.90 kg/L; or about 0.88 kg/L to about 0.90 kg/L; or about 0.89 kg/L to about 0.90 kg/L; or about 0.81 kg/L to about 0.89 kg/L; or about 0.82 kg/L to about 0.85 kg/L; or about 0.82 kg/L to about 0.84 kg/L; or about 0.85 kg/L to about 0.89 kg/L; or about 0.84 kg/L to about 0.86 kg/L; or about 0.84 kg/L to about 0.85 kg/L; or about 0.80 kg/L; about 0.81 kg/L; about 0.82 kg/L; about 0.83 kg/L; about 0.84 kg/L; about 0.85 kg/L; about 0.86 kg/L; about 0.87 kg/L; about 0.88 kg/L; about 0.89 kg/L; or about 0.90 kg/L. In some embodiments, the fuel blend comprises a density of 0.85 kg/L. In some embodiments, the fuel blend comprises a density of 0.86 kg/L. In some embodiments, the fuel blend comprises a density of 0.87 kg/L. In some embodiments, the fuel blend comprises a density of 0.88 kg/L. In some embodiments, the fuel blend comprises a density of 0.89 kg/L.

In some embodiments, the kinematic viscosity of the fuel blend can be adjusted by changing the abundance of one or more components of the blend. In some embodiments, the fuel blend comprises a kinematic viscosity at 40° C. of about 2.3 cSt to about 6.5 cSt, or any value or range in between such values. For example, in some embodiments, the fuel blend comprises a a kinematic viscosity at 40° C. of about 3.0 cSt to about 5.0 cSt. In some embodiments, the fuel blend comprises a kinematic viscosity at 40° C. of about 2.3 cSt. In some embodiments, the fuel blend comprises a kinematic viscosity at 40° C. of about 2.4 cSt. In some embodiments, the fuel blend comprises a kinematic viscosity at 40° C. of about 2.5 cSt. In some embodiments, the fuel blend comprises a kinematic viscosity at 40° C. of about 2.6 cSt. In some embodiments, the fuel blend comprises a kinematic viscosity at 40° C. of about 2.7 cSt. In some embodiments, the fuel blend comprises a kinematic viscosity at 40° C. of about 2.8 cSt. In some embodiments, the fuel blend comprises a kinematic viscosity at 40° C. of about 2.9 cSt. In some embodiments, the fuel blend comprises a kinematic viscosity at 40° C. of about 2.92 cSt. In some embodiments, the fuel blend comprises a kinematic viscosity at 40° C. of about 3.0 cSt. In some embodiments, the fuel blend comprises a kinematic viscosity at 40° C. of about 3.1 cSt. In some embodiments, the fuel blend comprises a kinematic viscosity at 40° C. of about 3.2 cSt. In some embodiments, the fuel blend comprises a kinematic viscosity at 40° C. of about 3.3 cSt. In some embodiments, the fuel blend comprises a kinematic viscosity at 40° C. of about 3.4 cSt. In some embodiments, the fuel blend comprises a kinematic viscosity at 40° C. of about 3.5 cSt. In some embodiments, the fuel blend comprises a kinematic viscosity at 40° C. of about 3.6 cSt. In some embodiments, the fuel blend comprises a kinematic viscosity at 40° C. of about 3.7 cSt. In some embodiments, the fuel blend comprises a kinematic viscosity at 40° C. of about 3.8 cSt. In some embodiments, the fuel blend comprises a kinematic viscosity at 40° C. of about 3.9 cSt. In some embodiments, the fuel blend comprises a kinematic viscosity at 40° C. of about 4.0 cSt. In some embodiments, the fuel blend comprises a kinematic viscosity at 40° C. of about 4.1 cSt. In some embodiments, the fuel blend comprises a kinematic viscosity at 40° C. of about 4.2 cSt. In some embodiments, the fuel blend comprises a kinematic viscosity at 40° C. of about 4.3 cSt. In some embodiments, the fuel blend comprises a kinematic viscosity at 40° C. of about 4.4 cSt. In some embodiments, the fuel blend comprises a kinematic viscosity at 40° C. of about 4.5 cSt. In some embodiments, the fuel blend comprises a kinematic viscosity at 40° C. of about 4.6 cSt. In some embodiments, the fuel blend comprises a kinematic viscosity at 40° C. of about 4.7 cSt. In some embodiments, the fuel blend comprises a kinematic viscosity at 40° C. of about 4.78 cSt. In some embodiments, the fuel blend comprises a kinematic viscosity at 40° C. of about 4.8 cSt. In some embodiments, the fuel blend comprises a kinematic viscosity at 40° C. of about 4.9 cSt. In some embodiments, the fuel blend comprises a kinematic viscosity at 40° C. of about 5.0 cSt. In some embodiments, the fuel blend comprises a kinematic viscosity at 40° C. of about 5.1 cSt. In some embodiments, the fuel blend comprises a kinematic viscosity at 40° C. of about 5.2 cSt. In some embodiments, the fuel blend comprises a kinematic viscosity at 40° C. of about 5.3 cSt. In some embodiments, the fuel blend comprises a kinematic viscosity at 40° C. of about 5.4 cSt. In some embodiments, the fuel blend comprises a kinematic viscosity at 40° C. of about 5.5 cSt. In some embodiments, the fuel blend comprises a kinematic viscosity at 40° C. of about 5.6 cSt. In some embodiments, the fuel blend comprises a kinematic viscosity at 40° C. of about 5.7 cSt. In some embodiments, the fuel blend comprises a kinematic viscosity at 40° C. of about 5.8 cSt. In some embodiments, the fuel blend comprises a kinematic viscosity at 40° C. of about 5.9 cSt. In some embodiments, the fuel blend comprises a kinematic viscosity at 40° C. of about 6.0 cSt. In some embodiments, the fuel blend comprises a kinematic viscosity at 40° C. of about 6.1 cSt. In some embodiments, the fuel blend comprises a kinematic viscosity at 40° C. of about 6.2 cSt. In some embodiments, the fuel blend comprises a kinematic viscosity at 40° C. of about 6.3 cSt. In some embodiments, the fuel blend comprises a kinematic viscosity at 40° C. of about 6.4 cSt. In some embodiments, the fuel blend comprises a kinematic viscosity at 40° C. of about 6.5 cSt.

In some embodiments, the heat value of the fuel blend can be adjusted by changing the abundance of one or more components of the blend. In some embodiments, the fuel blend comprises a heat value of about 37.0 MJ/kg to about 44.0 MJ/kg, or any value or range in between such values. For example, in some embodiments, the fuel blend comprises a heat value of about 42.0 MJ/kg to about 44.0 MJ/kg. In some embodiments, the fuel blend comprises a heat value of about 40.0 MJ/kg. In some embodiments, the fuel blend comprises a heat value of about 40.1 MJ/kg. In some embodiments, the fuel blend comprises a heat value of about 40.2 MJ/kg. In some embodiments, the fuel blend comprises a heat value of about 40.3 MJ/kg. In some embodiments, the fuel blend comprises a heat value of about 40.4 MJ/kg. In some embodiments, the fuel blend comprises a heat value of about 40.5 MJ/kg. In some embodiments, the fuel blend comprises a heat value of about 40.6 MJ/kg. In some embodiments, the fuel blend comprises a heat value of about 40.7 MJ/kg. In some embodiments, the fuel blend comprises a heat value of about 40.8 MJ/kg. In some embodiments, the fuel blend comprises a heat value of about 40.9 MJ/kg. In some embodiments, the fuel blend comprises a heat value of about 41.0 MJ/kg. In some embodiments, the fuel blend comprises a heat value of about 41.1 MJ/kg. In some embodiments, the fuel blend comprises a heat value of about 41.2 MJ/kg. In some embodiments, the fuel blend comprises a heat value of about 41.3 MJ/kg. In some embodiments, the fuel blend comprises a heat value of about 41.4 MJ/kg. In some embodiments, the fuel blend comprises a heat value of about 41.5 MJ/kg. In some embodiments, the fuel blend comprises a heat value of about 41.6 MJ/kg. In some embodiments, the fuel blend comprises a heat value of about 41.7 MJ/kg. In some embodiments, the fuel blend comprises a heat value of about 41.8 MJ/kg. In some embodiments, the fuel blend comprises a heat value of about 41.9 MJ/kg. In some embodiments, the fuel blend comprises a heat value of about 42.0 MJ/kg. In some embodiments, the fuel blend comprises a heat value of about 42.1 MJ/kg. In some embodiments, the fuel blend comprises a heat value of about 42.2 MJ/kg. In some embodiments, the fuel blend comprises a heat value of about 42.3 MJ/kg. In some embodiments, the fuel blend comprises a heat value of about 42.4 MJ/kg. In some embodiments, the fuel blend comprises a heat value of about 42.5 MJ/kg. In some embodiments, the fuel blend comprises a heat value of about 42.6 MJ/kg. In some embodiments, the fuel blend comprises a heat value of about 42.7 MJ/kg. In some embodiments, the fuel blend comprises a heat value of about 42.8 MJ/kg. In some embodiments, the fuel blend comprises a heat value of about 42.9 MJ/kg. In some embodiments, the fuel blend comprises a heat value of about 43.0 MJ/kg. In some embodiments, the fuel blend comprises a heat value of about 43.1 MJ/kg. In some embodiments, the fuel blend comprises a heat value of about 43.2 MJ/kg. In some embodiments, the fuel blend comprises a heat value of about 43.3 MJ/kg. In some embodiments, the fuel blend comprises a heat value of about 43.4 MJ/kg. In some embodiments, the fuel blend comprises a heat value of about 43.5 MJ/kg. In some embodiments, the fuel blend comprises a heat value of about 43.6 MJ/kg. In some embodiments, the fuel blend comprises a heat value of about 43.7 MJ/kg. In some embodiments, the fuel blend comprises a heat value of about 43.8 MJ/kg. In some embodiments, the fuel blend comprises a heat value of about 43.9 MJ/kg. In some embodiments, the fuel blend comprises a heat value of about 44.0 MJ/kg. In some embodiments, the fuel blend comprises a heat value that is greater than 44.0 MJ/kg. For example, in some embodiments, the fuel blend comprises a heat value of about 44.1 MJ/kg. In some embodiments, the fuel blend comprises a heat value of about 44.2 MJ/kg. In some embodiments, the fuel blend comprises a heat value of about 44.3 MJ/kg. In some embodiments, the fuel blend comprises a heat value of about 44.4 MJ/kg. In some embodiments, the fuel blend comprises a heat value of about 44.5 MJ/kg. In some embodiments, the fuel blend comprises a heat value of about 44.6 MJ/kg. In some embodiments, the fuel blend comprises a heat value of about 44.7 MJ/kg. In some embodiments, the fuel blend comprises a heat value of about 44.8 MJ/kg. In some embodiments, the fuel blend comprises a heat value of about 44.9 MJ/kg. In some embodiments, the fuel blend comprises a heat value of about 45.0 MJ/kg.

The present disclosure contemplates fuel blends, and methods of synthesis thereof, that do not include costly additives that are common in diesel fuel blends. Such additives are frequently used with biodiesels to attempt to replicate the attributes of petrodiesel, but the additives are costly and can increase the fuel's net lifetime emissions. The present disclosure identifies mixtures of organic components that have the properties required for a drop-in fuel blend while being free from additives and fossil carbon. In particular, the concentration of degummed Jatropha oil provides sufficient natural antioxidants to preclude the need for supplemental antioxidants. In some embodiments, the concentration of degummed Jatropha oil in the fuel blends of the present disclosure is increased to provide a higher antioxidant concentration. Similarly, the concentration of triacetin is sufficiently anti-microbial to prevent growth, while also offering substantial anti-knocking benefits. Bio-butanol, for example, also possess anti-microbial effects. In some embodiments, the concentration of triacetin and/or biobutanol in the fuel blends of the present technology is increased to make the fuel blend more resistant to microbial growth and contamination. Accordingly, in some embodiments, the fuel blend does not further comprise one or more additives selected from the group consisting of: antioxidants; antimicrobial agents; anti-knocking agents; and kinematic viscosity enhancers. In some embodiments, the fuel blend does not further comprise antioxidants. In some embodiments, the fuel blend does not further comprise antimicrobial agents. In some embodiments, the fuel blend does not further comprise anti-knocking agents. In some embodiments, the fuel blend does not further comprise antioxidants, antimicrobial agents, anti-knocking agents and kinematic viscosity enhancers.

EXAMPLES

The present technology, thus generally described, will be understood more readily by reference to the following examples, which are provided by way of illustration and are not intended to be limiting of the present technology.

Example 1. Formulation of a Fuel Blend of the Present Disclosure

An exemplary fuel blend formula is generated according to the methods of the present technology (e.g., (i) identify the physical characteristic values that meet the standards for a specific diesel fuel use; (ii) select available components that have the potential to reach said physical characteristic values in the final product; (iii) determine quantities of selected components to reach the required physical characteristic values using an appropriate software program (Microsoft Solver); (iv) further vary the amounts to minimize cost using an appropriate software program (Microsoft Solver); (v) mix/blend the components in mass quantities/proportions as per the requirements of the process; (vi) filter mixed components; and (vii) establish a quarantine for analysis, quality assurance and to ensure compliance with generally accepted standards) and the following parameters. To achieve drop-in fuel status, certain minimum characteristics must be met. Briefly, the fuel must meet minimum values, for example, for cetane value (50 or above), cloud point (273K or lower), density (0.89 kg/L or lower), kinematic viscosity at 40° C. (6.0 cSt or less), and heat value (42 MJ/kg or more). A fuel blend recipe was generated comprising biofuels (e.g., 1-propanol, 1-butanol, triacetin, and ethanol), plant oils (sweet orange peel oil, turpentine oil and refined degummed de-acidified Jatropha oil), biodiesels (e.g., Jatropha oil derived biodiesel, waste cooking oil derived biodiesel, waste transformer oil derived biodiesel, palm oil derived biodiesel, and Lin seed oil derived biodiesel) and renewable diesels (e.g., Fischer-Tropsch diesel fuel and/or a hydrotreated vegetable oil). The recipe explicitly excludes any fossil carbon derived components, as well as any further antimicrobial, anti-knocking, antioxidant additives, and kinematic viscosity enhancers.

By adjusting the recipe components, a variety of zero-fossil carbon fuel blends were identified that satisfied the requirements for drop-in fuels. An exemplary, non-limiting fuel blend is shown in Table 1, wherein the blend comprises RJO (refined degummed de-acidified Jatropha oil), BJ100 (100% biodiesel Jatropha), Biobutanol (biobutanol), Triacetin, BWCO (100% biodiesel waste cooking oil), HVO (hydrotreated vegetable oils), BPO100 (100% biodiesel palm oil), T Oil (wood/kraft turpentine Oil), and BWTO (biodiesel waste transformer oil). In Table 1, TOTALS=Totals composition; Cost: USD/kg; Density: kg/L; Kinematic viscosity: $mm^2/S$=cSt; Heat Value: MJ/kg; Cetane number=#; and Cloud Point=K (but could also be defined by Celsius scale). The composition mass percentages are as follows: refined degummed de-acidified Jatropha oil 0.020, Diesel fuel No. 2 0.000, sweet orange peel oil 0.000, Karanja oil 0.0000, 100% Jatropha biodiesel 0.635, biobutanol 0.0200, Diesel fuel No. 1 0.000, triacetin 0.031, 100% waste cooking oil biodiesel 0.030, Fischer-Tropsch diesel fuel 0.000, hydrotreated vegetable oil 0.034, 100% palm oil biodiesel 0.044, 100% linseed oil biodiesel 0.000, wood/kraft turpentine oil 0.084, waste transformer oil biodiesel 0.100. The petrodiesels D2 (Diesel Fuel No. 2) and D1 (Diesel Fuel No. 1) are not present in any quantity. The physical $_{properties}$ of this blend were calculated and, as shown in Table 1, this blend achieved the requirements for a drop-in fuel in terms of cetane value (53.02), density (880 kg/m³), kinematic viscosity at 40° C. (4.78), and heat value (42) as shown in Table 2. (*ASTM Standard for Biodiesel blends B5-B20 only. ASTM Standard for B21-B80 biodiesel blends (Current through Jun. 20, 2023); *European standard EN14214:2012+A1:2014; ****Indonesian Standard SNI 7182 for B30 biodiesel.

TABLE 1

| | | | | Exemplary Fuel Blend #13 of the Present Disclosure | | | | | |
|---|---|---|---|---|---|---|---|---|---|
| Components | C1 RJO | C2 D2 | C3 SOPO | C4 BJ100 | C5 Biobutanol | C6 Triacetin | C7 D1 | C8 BWCO100 | C9 F-T D |
| Costs ($/Kg) | 0.74 | 1.70 | 16.77 | 1.05 | 1.32 | 1.40 | 1.90 | 0.90 | 35.00 |
| Density | 0.900 | 0.85 | 0.83 | 0.87 | 0.81 | 1.11 | 0.80 | 0.884 | 0.800 |
| K. Viscosity | 23.90 | 2.87 | 2.13 | 4.23 | 2.27 | 7.80 | 0.80 | 4.92 | 2.81 |
| Heat Value | 39.90 | 43.00 | 34.60 | 42.60 | 33.10 | 17.30 | 39.47 | 37.1 | 45.0 |
| Cetane Number | 55.91 | 55.60 | 47.00 | 58.00 | 17.00 | 15.00 | 49.00 | 55.0 | 52.0 |
| Cloud Point | 282.00 | 279.50 | 279.00 | 283.20 | 157.60 | 277.00 | 233.00 | 268.00 | 264.15 |
| c1 | 1 | | | | | | | | |
| c2 | | 1 | | | | | | | |
| c3 | | | 1 | | | | | | |
| c4 | | | | 1 | | | | | |
| c5 | | | | | 1 | | | | |
| c6 | | | | | | 1 | | | |
| c7 | | | | | | | 1 | | |
| c8 | | | | | | | | 1 | |
| c9 | | | | | | | | | 1 |
| c10 | | | | | | | | | |
| c11 | | | | | | | | | |
| c12 | | | | | | | | | |
| c13 | | | | | | | | | |
| c4 + c8 + c11 + c14 | | | | 1 | | | | 1 | |
| c1:c14 | 1 | 1 | 1 | 1 | 1 | 1 | 1 | 1 | 1 |
| c14 | | | | | | | | | |
| | $\geq 0$ | $\geq 0$ | $\geq 0$ | $\geq 0$ | $\geq 0$ | $\geq 0$ | $\geq 0$ | $\geq 0$ | $\geq 0$ |

| Components | C10 HVO | C11 BPO100 | C12 BLS100 | C13 T.Oil | C14 BWTO100 | Mixture Totals | Symbol | Limits |
|---|---|---|---|---|---|---|---|---|
| Costs ($/Kg) | 1.84 | 1.50 | 4.90 | 2.28 | 1.00 | $ 1.20 | — | — |
| Density | 0.779 | 0.922 | 0.89 | 0.88 | 0.87 | 0.88 | $\leq$ | 0.89 |
| K. Viscosity | 2.92 | 5.59 | 4.22 | 2.50 | 6.20 | 4.78 | $\leq$ | 6.00 |
| Heat Value | 44.9 | 48.0 | 39.6 | 44.4 | 43.80 | 42.00 | $\geq$ | 42.00 |
| Cetane Number | 93.2 | 55.9 | 48.0 | 22.5 | 50.0 | 53.02 | $\geq$ | 50.00 |
| Cloud Point | 251.15 | 274.40 | 269.00 | 218.00 | 283.20 | 273.00 | $\leq$ | 273.00 |
| c1 | | | | | | 0.02 | $\leq$ | 0.02 |
| c2 | | | | | | 0.00 | $\leq$ | 0.00 |
| c3 | | | | | | 0.00 | $\leq$ | 0.02 |
| c4 | | | | | | 0.64 | $\leq$ | 0.70 |
| c5 | | | | | | 0.02 | $\leq$ | 0.02 |
| c6 | | | | | | 0.03 | $=$ | 0.03 |
| c7 | | | | | | 0.00 | $\leq$ | 0.00 |
| c8 | | | | | | 0.03 | $\leq$ | 0.03 |
| c9 | | | | | | 0.00 | $\leq$ | 0.00 |
| c10 | 1 | | | | | 0.03 | $\leq$ | 0.07 |
| c11 | | 1 | | | | 0.04 | $=$ | 0.05 |
| c12 | | | 1 | | | 0.00 | $\leq$ | 0.00 |
| c13 | | | | 1 | | 0.08 | $\leq$ | 0.09 |
| c4 + c8 + c11 + c14 | | 1 | | | 1 | 0.81 | $=$ | 0.81 |
| c1:c14 | 1 | 1 | 1 | 1 | 1 | 1.00 | 1.00 | 1.00 |
| c14 | | | | | 1 | 0.10 | $\leq$ | 0.10 |
| | $\geq 0$ | $\geq 0$ | $\geq 0$ | $\geq 0$ | $\geq 0$ | | | |

| | | | | | | | Output results | | | | | | | |
|---|---|---|---|---|---|---|---|---|---|---|---|---|---|---|
| | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ | z |
| Mass Fraction | 0.02 | 0 | 0 | 0.6352 | 0.02 | 0.031 | 0 | 0.03 | 0 | 0.0343 | 0.0448 | 0 | 0.0847 | 00.1 | 1.2/Kg |

The following is a description of the abbreviations, terms, and units shown in Table 1:
- RJO (C1; c1)=Refined Degummed De-acidified Jatropha oil (Vegetable oil, biofuel)
- D2 (C2; c2)=Diesel Fuel No. 2 (Petro fuel) is not present in any of the formulations of the present technology
- SOPO (C3; c3)=Sweet Orange Peel Oil (Vegetable oil, biofuel)
- BJ100 (C4; c4)=Biodiesel Jatropha @100%* (Biodiesel fuel)
- Biobutanol (C5; c5)=e.g. N butanol and Iso butanol are both non-hygroscopic, high energy content and biocidal Biofuels
- D1 (C7; c7)=Diesel Fuel No. 1 (Petro fuel) is not present in any of the formulations of the present technology
- Triacetin (C6; c6)=Triacetin (Biofuel: Anti knocking, biocide)
- BWCO100 (C8; c8)=Biodiesel Waste Cooking Oil @100% (Biodiesel fuel)
- F-T D (C9; c9)=Fischer-Tropsch Diesel Fuel (Renewable green synthetic fuel)
- HVO (C10; c10)=Hydrotreated Vegetable Oils (Renewable fuel)
- BPO100 (C11; c11)=Biodiesel Palm Oil @100% (Biodiesel fuel)
- BLS100 (C12; c12)=Biodiesel LinSeed Oil @100% Biodiesel fuel)
- T. Oil (C13; c13)=Wood/Kraft Turpentine Oil (Vegetable oil, biofuel, high energy content)
- BWTO100 (C14; c14)=Biodiesel Waste Transformer Oil (Biodiesel fuel)
- TOTALS=Totals from SOLVER Simulation Optimization
- Symbol=>=<
- Limits=Restrictions on a variable
- Costs: USD/kg as of 7/2022
- Density: kg/L
- K. Viscosity: =Kinematic Viscosity (mm$^2$/S=cSt)
- Heat Value: MJ/kg
- Cetane Number=#
- Cloud Point=K
- C1, C2, C3, C4, etc.=Codes for components
- X1, X2, X3, X4, etc.=Mass Fraction for corresponding component (C1, X1), (C13, X13), etc.

*The biodiesels cited in this explanation may be any suitable biodiesel that complies with ASTM and other generally accepted standard as depicted in Table 2.

With reference to Table 1: C1=RJO with a cost of 0.74 $/kg, density of 0.90 kg/L, K. viscosity of 23.90 cSt, heat value of 39.90 MJ/kg, cetane number of 55.91, and cloud point of 282.00K; C2=D2 with a cost of 1.70 $/kg, density of 0.85 kg/L, K. viscosity of 2.87 cSt, heat value of 43.00 MJ/kg, cetane number of 55.60, and cloud point of 279.50K; C3=SOPO with a cost of 16.77 $/kg, density of 0.83 kg/L, K. viscosity of 2.13, heat value of 34.60, cetane number of 47.00, and cloud point of 279.00K; C4=BJ100 with a cost of 1.05 $/kg, density of 0.87 kg/L, K. viscosity of 4.23 cSt, heat value of 42.60 MJ/kg, cetane number of 58.00, and cloud point of 283.20K; C5=biobutanol with a cost of 1.32 $/kg, density of 0.81 kg/L, K. viscosity of 2.27 cSt, heat value of 33.10 MJ/kg, cetane number of 17.00, and cloud point of 157.60K; C6=triacetin with a cost of 1.40 $/kg, density of 1.11 kg/L, K. viscosity of 7.80 cSt, heat value of 17.30 MJ/kg, cetane number of 15.00, and cloud point of 277.00K; C7=D1 with a cost of 1.90 $/kg, density of 0.80 kg/L, K. viscosity of 0.80 cSt, heat value of 39.47 MJ/kg, cetane number of 49.00, and cloud point of 233.00K; C8=BWCO100 with a cost of 0.90 $/kg, density of 0.884 kg/L, K. viscosity of 4.92 cSt, heat value of 37.1 MJ/kg, cetane number of 55.0, and cloud point of 268.00K; C9=F-TD with a cost of 35.00 $/kg, density of 0.80 kg/L, K. viscosity of 2.81 cSt, heat value of 45.0 MJ/kg, cetane number of 52.0, and cloud point of 264.15K; C10=HVO with a cost of 1.84 $/kg, density of 0.779 kg/L, K. viscosity of 2.92 cSt, heat value of 44.9 MJ/kg, cetane number of 93.2, and cloud point of 251.15K; C11=BPO100 with a cost of 1.50 $/kg, density of 0.922 kg/L, K. viscosity of 5.59 cSt, heat value of 48.0 MJ/kg, cetane number of 55.9, and cloud point of 274.40K; C12=BLS100 with a cost of 4.90 $/kg, density of 0.89 kg/L, K. viscosity of 4.22 cSt, heat value of 39.6 MJ/kg, cetane number of 48.0, and cloud point of 269.00K; C13=T. Oil with a cost of 2.28 $/kg, density of 0.88 kg/L, K. viscosity of 2.50 cSt, heat value of 44.4 MJ/kg, cetane number of 22.5, and cloud point of 218.00K; and C14=BWTO100 with a cost of 1.00 $/kg, density of 0.87 kg/L, K. viscosity of 6.20 cSt, heat value of 43.80 MJ/kg, cetane number of 50.0, and cloud point of 283.20K.

TABLE 2

| | | Biodiesel Fuel Blend Standards for Drop-In Fuels in Relation to Present Technology | | | |
|---|---|---|---|---|---|
| Standard | *ASTM D7467 | **ASTM B21-B80 S15 | *** European EN14214:2012 + A1:2014 | **** Indonesian SNI 7182 | Table 1 Blend |
| K. Viscosity cSt | 1.9-4.1 | 2.0-6.0 | 3.5-5.0 | 2.3-6.0 | 4.78 |
| Cetane No. | >40 | 51 | 51 | 51 | 53.02 |
| Cloud Point (° C.) | Report | Report | | 18° C. | −.15° C. (273 K) |
| % biodiesel | 20 | 21-80 | 30 | 40 | 81.00** |
| % biofuels | | | | | 19.00* |
| % petrodiesel | 80% | 79%-21% | [70%] | [70%] | 0.00*** |
| Density (kg/m$^3$) | | | 860-890 | 850-890 | 880.00 |
| Heat Value | | | | | 42.00 |

*See Table 1: X1 (.02) + X3 (0.00) + X5 (.02) + X6 (.031) + X10 (.03), X13 (0.847) = .1858 (~19% Biofuels).

See Table 1:

**This is the sum of the Mass Fractions of the Biodiesels in the Mixture: biodiesel total % = X4 (.635) + X8 (.03) + X11(.0448) + X14(0.1) = 81% (4 biodiesels are used in this case).

See Table 1:

***X2 (0.0) + X7 (0.0) = 0.0

The blend in Table 1 has comparable, or even improved properties, compared to several biodiesel fuel blend standards, despite not containing any petrodiesel, as shown in Table 2.

These results show that the fuel blends of the present technology can achieve drop-in status despite lacking any fossil fuel derived components or additives. Accordingly, the fuel blends of the present disclosure are useful for providing a zero-fossil carbon, environmentally friendly fuel blend.

Example 2. Formulation of a Fuel Blend Comprising High Amounts of HVO

An exemplary fuel blend comprising 80% HVO is generated according to the methods of the present technology as described herein and in Example 1 (e.g., (i) identify the physical characteristic values that meet the standards for a specific diesel fuel use; (ii) select available components that have the potential to reach said physical characteristic values in the final product; (iii) determine quantities of selected components to reach the required physical characteristic values using an appropriate software program (Microsoft Solver); (iv) further vary the amounts to minimize cost using an appropriate software program (Microsoft Solver); (v) mix/blend the components in mass quantities/proportions as per the requirements of the process; (vi) filter mixed components; and (vii) establish a quarantine for analysis, quality assurance and to ensure compliance with generally accepted standards).

By adjusting the recipe components, a variety of zero-fossil carbon fuel blends were identified that satisfied the requirements for drop-in fuels with 80% HVO. An exemplary, non-limiting fuel blend is shown in Table 3. As one of skill in the art would appreciate, the percentage of HVO can be further modified and additional exemplary fuel blends can be generated according to the methods of the present technology. One of skill in the art would further understand that the amount of any of the components of the drop-in fuel blends can be adjusted to meet certain minimum or maximum values, for example, for cetane value, for cloud point, for density, for kinematic viscosity, and/or for heat value of the fuel blend. Setting a total of 80% HVO for the fuel blend, the other components were added in the appropriate quantities to achieve a drop-in fuel blend with the desired properties. In this example, the composition mass percentages are as follows: refined degummed de-acidified Jatropha oil 2%; biobutanol 2%; triacetin 3%, biodiesel waste cooking oil 3%; HVO 80%; biodiesel palm oil 5%; and biodiesel waste transformer oil 5%. Similar experiments using, e.g., 90% HVO and adjusting the fuel blend components accordingly can also be performed.

TABLE 3

Exemplary Fuel Blend of the Present Disclosure Comprising 80% HVO

| Ingredients | C1<br>RJO | C2<br>D2 | C3<br>SOPO | C4<br>BJ100 | C5<br>Biobutanol | C6<br>Triacetin | C7<br>D1 | C8<br>BWCO100 | C9<br>F-TD |
|---|---|---|---|---|---|---|---|---|---|
| Costs ($/Kg) | 0.74 | 1.70 | 16.77 | 1.05 | 1.32 | 1.40 | 1.90 | 0.90 | 35.00 |
| Density | 0.90 | 0.85 | 0.83 | 0.87 | 0.81 | 1.11 | 0.80 | 0.88 | 0.80 |
| K. Viscosity | 23.90 | 2.87 | 2.13 | 4.23 | 2.27 | 7.80 | 0.80 | 4.92 | 2.81 |
| Heat Value | 39.90 | 43.00 | 34.60 | 42.60 | 33.10 | 17.30 | 39.47 | 37.10 | 45.00 |
| Cetane Number | 55.91 | 55.60 | 47.00 | 58.00 | 17.00 | 15.00 | 49.00 | 55.00 | 52.00 |
| Cloud Point | 282.00 | 279.50 | 279.00 | 283.20 | 183.20 | 277.00 | 233.00 | 268.00 | 264.10 |
| Coefficients | | | | | | | | | |
| $X^1$ | 1 | | | | | | | | |
| $X^2$ | | 1 | | | | | | | |
| $X^3$ | | | 1 | | | | | | |
| $X^4$ | | | | 1 | | | | | |
| $X^5$ | | | | | 1 | | | | |
| $X^6$ | | | | | | 1 | | | |
| $X^7$ | | | | | | | 1 | | |
| $X^8$ | | | | | | | | 1 | |
| $X^9$ | | | | | | | | | 1 |
| $X^{10}$ | | | | | | | | | |
| $X^{11}$ | | | | | | | | | |
| $X^{12}$ | | | | | | | | | |
| $X^{13}$ | | | | | | | | | |
| $X^{14}$ | | | | | | | | | |
| $(X^4 + X^8 + X^{11} + X^{12} + X^{14})$ | | | | 1 | | | | 1 | |
| $X^1 : X^{15}$ | 1 | 1 | 1 | 1 | 1 | 1 | 1 | 1 | 1 |

| Ingredients | C10<br>HVO | C11<br>BWPO100 | C12<br>BLS100 | C13<br>T.OiL | C14<br>BWTO100 | Mixture Totals | symbol | Limits | Average |
|---|---|---|---|---|---|---|---|---|---|
| Costs ($/Kg) | 1.84 | 1.50 | 4.90 | 2.28 | 1.00 | 1.71 | | | |
| Density | 0.78 | 0.92 | 0.89 | 0.88 | 0.87 | 0.81 | <= | 0.89 | 0.87 |
| K. Viscosity | 2.92 | 5.59 | 4.22 | 2.50 | 6.20 | 3.83 | <= | 6.00 | 5.23 |
| Heat Value | 44.90 | 39.90 | 39.56 | 44.40 | 43.80 | 43.20 | ≥ | 42.00 | 38.90 |

TABLE 3-continued

Exemplary Fuel Blend of the Present Disclosure Comprising 80% HVO

| | | | | | | | | | |
|---|---|---|---|---|---|---|---|---|---|
| Cetane Number | 93.20 | 55.90 | 48.00 | 22.50 | 50.00 | 83.41 | ≥ | 50.00 | 48.15 |
| Cloud Point | 251.15 | 274.40 | 269.00 | 218.00 | 283.20 | 254.45 | <= | 273.00 | 260.34 |

Coefficients

| | | | | | | | | | |
|---|---|---|---|---|---|---|---|---|---|
| $X^1$ | | | | | | 0.02 | <= | 0.020 | C1 |
| $X^2$ | | | | | | 0.00 | <= | 0.000 | C2 |
| $X^3$ | | | | | | 0.00 | <= | 0.020 | C3 |
| $X^4$ | | | | | | 0.00 | <= | 0.700 | C4 |
| $X^5$ | | | | | | 0.02 | = | 0.020 | C5 |
| $X^6$ | | | | | | 0.03 | = | 0.030 | C6 |
| $X^7$ | | | | | | 0.00 | <= | 0.000 | C7 |
| $X^8$ | | | | | | 0.03 | <= | 0.030 | C8 |
| $X^9$ | | | | | | 0.00 | <= | 0.000 | C9 |
| $X^{10}$ | 1 | | | | | 0.80 | = | 0.800 | C10 |
| $X^{11}$ | | 1 | | | | 0.05 | = | 0.050 | C11 |
| $X^{12}$ | | | 1 | | | 0.00 | <= | 0.000 | C12 |
| $X^{13}$ | | | | 1 | | 0.00 | <= | 0.090 | C13 |
| $X^{14}$ | | | | | 1 | 0.05 | = | 0.100 | C14 |
| ($X^4 + X^8$ + $X^{11} + X^{12}$ + $X^{14}$) | | 1 | 1 | | 1 | 0.13 | = | 0.810 | C4 + C8 + C11 + C12 + C14 |
| $X^1:X^{15}$ | 1 | 1 | 1 | 1 | 1 | 1.0 | = | 1.0 | Sum X's |

Output results

| | $X^1$ | $X^2$ | $X^3$ | $X^4$ | $X^5$ | $X^6$ | $X^7$ | $X^8$ | $X^9$ | $X^{10}$ | $X^{11}$ | $X^{12}$ | $X^{13}$ | $X^{14}$ | Z |
|---|---|---|---|---|---|---|---|---|---|---|---|---|---|---|---|
| Mass Fraction | 0.020 | 0.000 | 0.000 | 0.000 | 0.020 | 0.030 | 0.000 | 0.030 | 0.000 | 0.800 | 0.050 | 0.000 | 0.000 | 0.050 | 1.71 |

The following is a description of the abbreviations, terms, and units shown in Table 3:

RJO=Refined Degummed De-acidified Jatropha oil (Vegetable oil, biofuel)
D2=Diesel Fuel No. 2 (Petro fuel) is not present in any of the formulations of the present technology
SOPO=Sweet Orange Peel Oil (Vegetable oil, biofuel)
BJ100=Biodiesel Jatropha @100%* (Biodiesel fuel)
Biobutanol=e.g. N butanol and Iso butanol are both non-hygroscopic, high energy content and biocidal Biofuels
D1=Diesel Fuel No. 1 (Petro fuel) is not present in any of the formulations of the present technology
Triacetin=Triacetin (Biofuel: Anti knocking, biocide)
BWCO100=Biodiesel Waste Cooking Oil @100% (Biodiesel fuel)
F-T D=Fischer-Tropsch Diesel Fuel (Renewable green synthetic fuel)
HVO=Hydrotreated Vegetable Oils (Renewable fuel)
BPO100=Biodiesel Palm Oil @100% (Biodiesel fuel)
BLS100=Biodiesel LinSeed Oil @100% Biodiesel fuel)
T. Oil (Low Sulphur)=Wood/Kraft Turpentine Oil (Vegetable oil, biofuel, high energy content)
BWTO100=Biodiesel Waste Transformer Oil (Biodiesel fuel)
TOTALS=Totals from SOLVER Simulation Optimization
Symbol=>=<
Limits=Restrictions on a variable
Costs: USD/kg as of 7/2022
Density: kg/L
K. Viscosity: =Kinematic Viscosity (mm²/S=cSt)
Heat Value: MJ/kg
Cetane Number=#
Cloud Point=K
C1, C2, C3, C4, etc.=Codes for components $X^1$, $X^2$, $X^3$, $X^4$, etc.=Mass Fraction for corresponding component (C1, $X^1$), (C13, $X^{13}$), etc.

*The biodiesels cited in this explanation may be any suitable biodiesel that complies with ASTM and other generally accepted standard as depicted in Table 2.

With reference to Table 3: C1=RJO with a cost of 0.74 $/kg, density of 0.90 kg/L, K. viscosity of 23.90 cSt, heat value of 39.90 MJ/kg, cetane number of 55.91, and cloud point of 282.00K; C2=D2 with a cost of 1.70 $/kg, density of 0.85 kg/L, K. viscosity of 2.87 cSt, heat value of 43.00 MJ/kg, cetane number of 55.60, and cloud point of 279.50K; C3=SOPO with a cost of 16.77 $/kg, density of 0.83 kg/L, K. viscosity of 2.13, heat value of 34.60, cetane number of 47.00, and cloud point of 279.00K; C4=BJ100 with a cost of 1.05 $/kg, density of 0.87 kg/L, K. viscosity of 4.23 cSt, heat value of 42.60 MJ/kg, cetane number of 58.00, and cloud point of 283.20K; C5=biobutanol with a cost of 1.32 $/kg, density of 0.81 kg/L, K. viscosity of 2.27 cSt, heat value of 33.10 MJ/kg, cetane number of 17.00, and cloud point of 183.20K; C6=triacetin with a cost of 1.40 $/kg, density of 1.11 kg/L, K. viscosity of 7.80 cSt, heat value of 17.30 MJ/kg, cetane number of 15.00, and cloud point of 277.00K; C7=D1 with a cost of 1.90 $/kg, density of 0.80 kg/L, K. viscosity of 0.80 cSt, heat value of 39.47 MJ/kg, cetane number of 49.00, and cloud point of 233.00K; C8=BWCO100 with a cost of 0.90 $/kg, density of 0.88 kg/L, K. viscosity of 4.92 cSt, heat value of 37.10 MJ/kg, cetane number of 55.00, and cloud point of 268.00K; C9=F-TD with a cost of 35.00 $/kg, density of 0.80 kg/L, K. viscosity of 2.81 cSt, heat value of 45.00 MJ/kg, cetane number of 52.00, and cloud point of 264.10K; C10=HVO with a cost of 1.84 $/kg, density of 0.78 kg/L, K. viscosity of 2.92 cSt, heat value of 44.90 MJ/kg, cetane number of 93.20, and cloud point of 251.15K; C11=BWPO100 with a cost of 1.50 $/kg, density of 0.92 kg/L, K. viscosity of 5.59 cSt, heat value of 39.90 MJ/kg, cetane number of 55.90, and cloud point of 274.40K; C12=BLS100 with a cost of 4.90 $/kg, density of 0.89 kg/L, K. viscosity of 4.22 cSt, heat value of 39.56 MJ/kg, cetane number of 48.00, and cloud point of 269.00K; C13=T. Oil with a cost of 2.28 $/kg, density of 0.88 kg/L, K. viscosity of 2.50 cSt, heat value of 44.40 MJ/kg, cetane number of 22.50, and cloud point of 218.00K; and C14=BWTO100 with a cost of 1.00 $/kg, density of 0.87 kg/L, K. viscosity of 6.20 cSt, heat value of 43.80 MJ/kg, cetane number of 50.00, and cloud point of 283.20K.

Table 4 provides a summary of the properties of the drop-in fuel blend shown in Table 1 and the fuel blend comprising 80% HVO shown in Table 3.

TABLE 4

Properties of Drop-In Fuel Blends

| Property | Drop-in fuel blend shown in Table 1 | HVO values | Drop-in fuel blend properties at 80% HVO shown in Table 3 |
|---|---|---|---|
| Cloud Point (K) | 273 | 251.15 | 254.45 |
| Cetane Number | 53.02 | 93.2 | 83.41 |
| Heat Value (MJ/kg) | 42 | 44.9 | 43.20 |
| Density (kg/L) | 0.89 | 0.779 | 0.81 |
| K. Viscosity (cSt) | 4.78 | 2.92 | 3.83 |

These results show that the fuel blends of the present technology can achieve drop-in status with elevated amounts of HVO and lacking any fossil fuel derived components or additives. Accordingly, the fuel blends of the present disclosure are useful for providing a zero-fossil carbon, environmentally friendly fuel blend.

Example 3. Determining the Physical-Chemical Properties and Engine Performance of a Fuel Blend of the Present Technology The quaternary biodiesel fuel blends of the present technology can be tested by methods known in the art to determine their performance and combustion characteristics, and these characteristics can be compared to those of diesel fuel. For example, a drop-in fuel blend can be generated according to the methods disclosed herein and the following tests may be performed: (1) cetane number test (test method ASTM D613); (2) calorific value test (test method employing a bomb calorimeter that measures the heating value of the fuel); (3) kinematic viscosity test (test method ASTM D445); and (4) cloud point test (method ASTM D2500). The values obtained are compared to the ASTM standards for biodiesel mixes and standard diesel. Additionally or alternatively, the performance and combustion characteristics of the components of the fuel blends of the present technology can be ascertained from publicly available reports providing such information.

The biodiesel fuel blends of the present technology can also be tested by methods known in the art to measure engine performance and exhaust emissions. For example, a drop-in fuel blend can be generated according to the methods disclosed herein and an engine performance test may be performed to assess the fuel blend performance in an engine, including an assessment of parameters such as power output, fuel consumption, and thermal efficiency. Briefly, engine testing involves running the fuel in a controlled engine environment and monitoring the performance parameters. Performance may be measured with a dynamometer that measures brake horsepower information (rotational speed and torque). The dynamometer then calculates the brake horse power (BHP) under different loads. The brake thermal efficiency (BTE) can be calculated to determine the relationship of the energy inside the fuel consumed and the work performed by the engine in the same amount of time as measure in BHP by the dynamometer. The results can be compared to those obtained using standard fuels, such as diesel. Exhaust emissions, such as nitrogen oxides (NOx), carbon monoxide (CO), unburnt hydrocarbons (HC), and particulate matter (PM) can also be measured during the dynamometer test.

EQUIVALENTS

The methods, systems, and compositions illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the disclosure claimed. Thus, it should be understood that although the present disclosure has been specifically disclosed by preferred embodiments and optional features, modification and variation of the disclosure embodied therein herein disclosed may be resorted to by those skilled in the art, and that such modifications and variations are considered to be within the scope of this disclosure.

The disclosure has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein. The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds, compositions, or biological systems, which can, of course, vary. It is also to be understood that the terminology used herein is for the purpose of describing particular embodiments only, and is not intended to be limiting.

One skilled in the art readily appreciates that the present disclosure is well adapted to carry out the objects and obtain the ends and advantages mentioned, as well as those inherent therein. Modifications therein and other uses will occur to those skilled in the art. These modifications are encompassed within the spirit of the disclosure and are defined by the scope of the claims, which set forth non-limiting embodiments of the disclosure.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

In addition, where features or aspects of the disclosure are described in terms of Markush groups, those skilled in the art will recognize that the disclosure is also thereby described in terms of any individual member or subgroup of members of the Markush group.

All references, articles, publications, patents, patent publications, and patent applications cited herein are incorporated by reference in their entireties for all purposes. However, mention of any reference, article, publication, patent, patent publication, and patent application cited herein is not, and should not be taken as, an acknowledgment or any form of suggestion that they constitute valid prior art or form part of the common general knowledge in any country in the world.

Other embodiments are set forth in the following claims.

What is claimed is:

1. A drop-in biodiesel fuel blend consisting of:
   (a) one or more biofuels selected from the group consisting of: 1-propanol; 1-butanol; and triacetin;
   (b) one or more plant oils selected from the group consisting of: sweet orange peel oil; turpentine oil; and refined degummed de-acidified Jatropha oil;
   (c) one or more biodiesels selected from the group consisting of: Jatropha oil derived biodiesel; waste cooking oil derived biodiesel; waste transformer oil derived biodiesel; palm oil derived biodiesel; and linseed oil derived biodiesel; and
   (d) one or more renewable diesels, wherein the renewable diesel is a Fischer-Tropsch diesel fuel and/or a hydrotreated vegetable oil; and
   wherein the fuel blend does not comprise fossil fuel derived carbon.

2. The fuel blend of claim 1, wherein the one or more biofuels are triacetin and 1-biobutanol; wherein the one or more plant oils are turpentine oil and refined degummed de-acidified Jatropha oil; wherein the one or more biodiesels are Jatropha oil derived biodiesel, waste cooking oil derived biodiesel, waste transformer oil derived biodiesel, and palm oil derived biodiesel; and/or wherein the one or more renewable diesels is a hydrotreated vegetable oil.

3. The fuel blend of claim 2, wherein the triacetin is about 3.1% of the mass of the fuel blend and the 1-biobutanol is about 2% of the mass of the fuel blend; wherein the refined degummed de-acidified Jatropha oil is about 2% of the mass of the fuel blend and the turpentine oil is about 8.47% of the mass of the fuel blend; wherein the Jatropha oil derived biodiesel is about 63.52% of the mass of the fuel blend, the waste cooking oil derived biodiesel is about 3% of the mass of the fuel blend, the waste transformer oil derived biodiesel is about 10% of the mass of the fuel blend, and the palm oil derived biodiesel is about 4.48% of the mass of the fuel blend; and/or wherein the hydrotreated vegetable oil is about 3.43% to about 5.0% of the mass of the fuel blend.

4. The fuel blend of claim 1, wherein, triacetin is about 3.1% of the mass of the fuel blend, 1-biobutanol is about 2% of the mass of the fuel blend, refined degummed de-acidified Jatropha oil is about 2% of the mass of the fuel blend, turpentine oil is about 8.47% of the mass of the fuel blend, Jatropha oil derived biodiesel is about 63.52% of the mass of the fuel blend, waste cooking oil derived biodiesel is about 3% of the mass of the fuel blend, waste transformer oil derived biodiesel is about 10% of the mass of the fuel blend, palm oil derived biodiesel is about 4.48% of the mass of the fuel blend, and hydrotreated vegetable oil is about 3.43% of the mass of the fuel blend.

5. The fuel blend of claim 1, wherein the fuel blend comprises:
   a cetane value of about 40 to about 90;
   a cloud point of about 273K to about 233.15K;
   a density of about 0.81 kg/L to about 0.88 kg/L;
   a kinematic viscosity at 40° C. of about 2.3 cSt to about 6.0 cSt; and
   a heat value of about 42 MJ/kg to about 44 MJ/kg.

6. The fuel blend of claim 5, wherein the cetane value ranges from about 80 to about 85.

7. The fuel blend of claim 1, wherein the fuel blend comprises:
   a cetane value of about 53.02;
   a cloud point of about 273K;
   a density of about 0.88 kg/L;
   a kinematic viscosity at 40° C. of about 4.78 cSt; and
   a heat value of about 42 MJ/kg.

8. A method for generating a drop-in biodiesel fuel blend consisting of mixing:
   (a) an amount of one or more biofuels selected from the group consisting of 1-propanol, 1-butanol, and triacetin;
   (b) an amount of one or more plant oils selected from the group consisting of sweet orange peel oil; turpentine oil and refined degummed de-acidified Jatropha oil;
   (c) an amount of one or more biodiesels selected from the group consisting of Jatropha oil derived biodiesel, waste cooking oil derived biodiesel, waste transformer oil derived biodiesel, palm oil derived biodiesel, and Lin seed oil derived biodiesel; and
   (d) an amount of one or more renewable diesels, wherein the renewable diesel is a Fischer-Tropsch diesel fuel and/or a hydrotreated vegetable oil,
   to create the fuel blend, wherein the fuel blend comprises:
   a cetane value of about 40 to about 55;
   a cloud point of about 273K to about 233.15K
   a density of about 0.81 kg/L to about 0.89 kg/L;

a kinematic viscosity at 40° C. of about 2.3 cSt to about 6.0 cSt; and a heat value of about 42 MJ/kg to about 44 MJ/kg; and wherein the fuel blend does not comprise fossil fuel derived carbon.

9. The method of claim 8, wherein the one or more biofuels are triacetin and 1-biobutanol; wherein the one or more plant oils are turpentine oil and refined degummed de-acidified Jatropha oil; wherein the one or more biodiesels are Jatropha oil derived biodiesel, waste cooking oil derived biodiesel, waste transformer oil derived biodiesel, and palm oil derived biodiesel; wherein the one or more renewable diesels is a hydrotreated vegetable oil; and/or wherein the method does not further comprise blending one or more additives selected from antioxidants, antimicrobial agents, anti-knocking agents, and kinematic viscosity enhancers.

10. The method of claim 9, wherein the triacetin is about 3.1% of the mass of the fuel blend and the 1-biobutanol is about 2% of the mass of the fuel blend; wherein the refined degummed de-acidified Jatropha oil is about 2% of the mass of the fuel blend and the turpentine oil is about 8.47% of the mass of the fuel blend; wherein the Jatropha oil derived biodiesel is about 63.52% of the mass of the fuel blend, the waste cooking oil derived biodiesel is about 3% of the mass of the fuel blend, the waste transformer oil derived biodiesel is about 10% of the mass of the fuel blend, and the palm oil derived biodiesel is about 4.48% of the mass of the fuel blend; and wherein the hydrotreated vegetable oil is about 3.43% of the mass of the fuel blend.

11. The method of claim 8, wherein triacetin is about 3.1% of the mass of the fuel blend, 1-biobutanol is about 2% of the mass of the fuel blend, refined degummed de-acidified Jatropha oil is about 2% of the mass of the fuel blend, turpentine oil is about 8.47% of the mass of the fuel blend, Jatropha oil derived biodiesel is about 63.52% of the mass of the fuel blend, waste cooking oil derived biodiesel is about 3% of the mass of the fuel blend, waste transformer oil derived biodiesel is about 10% of the mass of the fuel blend, palm oil derived biodiesel is about 4.48% of the mass of the fuel blend, and hydrotreated vegetable oil is about 3.43% of the mass of the fuel blend.

12. The method of claim 8, wherein the fuel blend comprises:

a cetane value of about 50;

a cloud point of about 273K;

a density of about 0.85 kg/L;

a kinematic viscosity at 40° C. of about 6.0 cSt; and a heat value of about 42 MJ/kg.

13. The method of claim 8, wherein the hydrotreated vegetable oil is about 70% to about 99% of the mass of the fuel blend.

14. The method of claim 13, wherein the hydrotreated vegetable oil is about 80% of the mass of the fuel blend or about 90% of the mass of the fuel blend.

15. A drop-in biodiesel fuel blend consisting of:
(a) one or more biofuels selected from the group consisting of: 1-propanol; 1-butanol; and triacetin;
(b) one or more plant oils selected from the group consisting of: sweet orange peel oil; turpentine oil; and refined degummed de-acidified Jatropha oil;
(c) one or more biodiesels selected from the group consisting of: Jatropha oil derived biodiesel; waste cooking oil derived biodiesel; waste transformer oil derived biodiesel; palm oil derived biodiesel; and linseed oil derived biodiesel; and
(d) one or more renewable diesels, wherein the renewable diesel is a Fischer-Tropsch diesel fuel and/or a hydrotreated vegetable oil;

wherein the fuel blend does not comprise fossil fuel derived carbon;

wherein each of (a)-(d) is present in an amount that produces a fuel blend comprising:

a cetane value of about 40 to about 91;

a cloud point of about 252K to about 275K;

a density of about 0.80 kg/L to about 0.90 kg/L;

a kinematic viscosity of about 3 cSt to about 5 cSt; and a heat value of about 42 MJ/kg to about 44 MJ/kg; and wherein the fuel blend does not comprise fossil fuel derived carbon.

16. The fuel blend of claim 15, wherein the cetane value ranges from about 80 to about 85.

17. The fuel blend of claim 15, wherein the one or more renewable diesels is a hydrotreated vegetable oil.

18. The fuel blend of claim 17, wherein the hydrotreated vegetable oil is about 70% to about 99% of the mass of the fuel blend.

19. The fuel blend of claim 18, wherein the hydrotreated vegetable oil is about 80% of the mass of the fuel blend or about 90% of the mass of the fuel blend.

* * * * *